(12) United States Patent
Amundson et al.

(10) Patent No.: US 11,589,667 B2
(45) Date of Patent: Feb. 28, 2023

(54) DEFORMABLE END EFFECTORS FOR COSMETIC ROBOTICS

(71) Applicant: WINK ROBOTICS, Oakland, CA (US)

(72) Inventors: Kurt Amundson, Berkeley, CA (US); Nathan Harding, Oakland, CA (US); H. Keith Nishihara, Los Altos, CA (US); Russell B. Ford, Palo Alto, CA (US)

(73) Assignee: WINK ROBOTICS, Oakland, CA (US)

( * ) Notice: Subject to any disclaimer, the term of this patent is extended or adjusted under 35 U.S.C. 154(b) by 958 days.

(21) Appl. No.: 16/461,250

(22) PCT Filed: Nov. 16, 2017

(86) PCT No.: PCT/US2017/061899
§ 371 (c)(1),
(2) Date: May 15, 2019

(87) PCT Pub. No.: WO2018/093971
PCT Pub. Date: May 24, 2018

(65) Prior Publication Data
US 2019/0314997 A1    Oct. 17, 2019

Related U.S. Application Data

(60) Provisional application No. 62/423,000, filed on Nov. 16, 2016.

(51) Int. Cl.
*A45D 44/00* (2006.01)
*A41G 5/02* (2006.01)
(Continued)

(52) U.S. Cl.
CPC ............. *A45D 44/00* (2013.01); *A41D 13/11* (2013.01); *A41D 13/1169* (2013.01);
(Continued)

(58) Field of Classification Search
None
See application file for complete search history.

(56) References Cited

U.S. PATENT DOCUMENTS 7,600,519 B2   10/2009   Dinh
7,632,378 B2   12/2009   Sakurai et al.
(Continued)

FOREIGN PATENT DOCUMENTS

CN   102406308       4/2011
CN   102371586 A  *  3/2012   ............ B25J 13/085
(Continued)

OTHER PUBLICATIONS

Sanctuary, H., "Robotic fingers with a gentle touch", Technologist Online, Feb. 11, 2016, http://www.technologist.eu/robotic-fingers-with-a-gentle-touch.

*Primary Examiner* — Vicky A Johnson
(74) *Attorney, Agent, or Firm* — Diederiks & Whitelaw, PLC

(57) ABSTRACT

A device for ensuring safe operation of a robot used for cosmetics applications, including the retrofitting of robots not originally design for such applications. In some embodiments, the robot is used for the automatic placement of eyelash extensions onto the natural eyelashes of a subject. In some embodiments, a safety barrier is provided by a physical barrier or light curtain. In other embodiments, readily deformable end effectors are used.

27 Claims, 28 Drawing Sheets

(51) Int. Cl.

| | | |
|---|---|---|
| *A45D 40/30* | (2006.01) | |
| *B25J 9/16* | (2006.01) | |
| *B25J 11/00* | (2006.01) | |
| *G06K 9/62* | (2022.01) | |
| *A41D 13/11* | (2006.01) | |
| *A41G 3/00* | (2006.01) | |
| *B05B 13/04* | (2006.01) | |
| *B25J 15/00* | (2006.01) | |
| *B25J 18/06* | (2006.01) | |
| *B25J 19/06* | (2006.01) | |
| *G06T 7/70* | (2017.01) | |
| *B25J 9/02* | (2006.01) | |
| *B25J 9/04* | (2006.01) | |
| *G06V 10/42* | (2022.01) | |
| *G06V 40/16* | (2022.01) | |
| *A45D 29/00* | (2006.01) | |
| *B25J 9/10* | (2006.01) | |

(52) U.S. Cl.
CPC ............ *A41D 13/1184* (2013.01); *A41G 3/00* (2013.01); *A41G 5/02* (2013.01); *A45D 40/30* (2013.01); *B05B 13/0431* (2013.01); *B25J 9/023* (2013.01); *B25J 9/043* (2013.01); *B25J 9/1615* (2013.01); *B25J 9/1676* (2013.01); *B25J 9/1679* (2013.01); *B25J 9/1697* (2013.01); *B25J 11/008* (2013.01); *B25J 11/0075* (2013.01); *B25J 15/0019* (2013.01); *B25J 18/06* (2013.01); *B25J 19/06* (2013.01); *G06K 9/6256* (2013.01); *G06K 9/6262* (2013.01); *G06T 7/70* (2017.01); *G06V 10/42* (2022.01); *G06V 40/171* (2022.01); *A45D 29/00* (2013.01); *A45D 2044/007* (2013.01); *B25J 9/1045* (2013.01); *B25J 9/1694* (2013.01); *G06T 2207/10012* (2013.01); *G06T 2207/30201* (2013.01)

(56) References Cited

U.S. PATENT DOCUMENTS

| | | | |
|---|---|---|---|
| 7,648,364 B2 | 1/2010 | Dauga et al. | |
| 8,036,448 B2 | 10/2011 | Gildenberg | |
| 8,061,365 B2 | 11/2011 | Rehkemper et al. | |
| 8,113,218 B2 | 2/2012 | Nguyen | |
| 8,127,774 B2 | 3/2012 | Dinh | |
| 8,396,598 B2 | 3/2013 | Sutherland et al. | |
| 8,439,043 B2 | 5/2013 | Davis | |
| 8,464,732 B2 | 6/2013 | Wong | |
| 8,464,733 B2 | 6/2013 | Franklin et al. | |
| 8,701,685 B2 | 4/2014 | Chipman | |
| 8,899,242 B2 | 12/2014 | Wong | |
| 8,911,453 B2 | 12/2014 | Tenney et al. | |
| 8,967,158 B2 | 3/2015 | Sanbonmatsu | |
| 9,043,025 B2 * | 5/2015 | Brooks | B25J 9/1676 700/255 |
| 9,408,452 B1 | 8/2016 | Al-Khulaifi | |
| 9,427,562 B2 | 8/2016 | Blacker | |
| 2002/0188293 A1 | 12/2002 | Manzo | |
| 2007/0221701 A1 | 9/2007 | Ortiz et al. | |
| 2008/0187676 A1 * | 8/2008 | Blankenship | B25J 17/0266 427/446 |
| 2009/0248039 A1 | 10/2009 | Cooper et al. | |
| 2010/0245971 A1 * | 9/2010 | Sotzing | D03D 15/292 359/265 |
| 2011/0298579 A1 | 12/2011 | Hardegger et al. | |
| 2012/0067364 A1 | 3/2012 | Wong | |
| 2012/0158019 A1 * | 6/2012 | Tenney | A61B 17/32053 606/133 |
| 2012/0290134 A1 | 11/2012 | Zhao et al. | |
| 2013/0018333 A1 | 1/2013 | Thomason et al. | |
| 2014/0174463 A1 | 6/2014 | Wong | |
| 2014/0261430 A1 | 9/2014 | Davis | |
| 2014/0261514 A1 | 9/2014 | Martins et al. | |
| 2015/0359282 A1 * | 12/2015 | Calina | A41G 5/02 132/53 |
| 2016/0000606 A1 | 1/2016 | Spier | |
| 2016/0058513 A1 | 3/2016 | Giorgi | |
| 2016/0074120 A1 | 3/2016 | Farritor et al. | |
| 2016/0107314 A1 | 4/2016 | Takemoto et al. | |
| 2016/0295827 A1 * | 10/2016 | Axelsson | A01J 5/0175 |
| 2019/0083167 A1 | 3/2019 | Hyodo | |

FOREIGN PATENT DOCUMENTS

| | | |
|---|---|---|
| DE | 202013105501 | 3/2015 |
| KR | 20150008290 | 1/2015 |
| WO | WO 2018/0116393 | 6/2018 |

\* cited by examiner

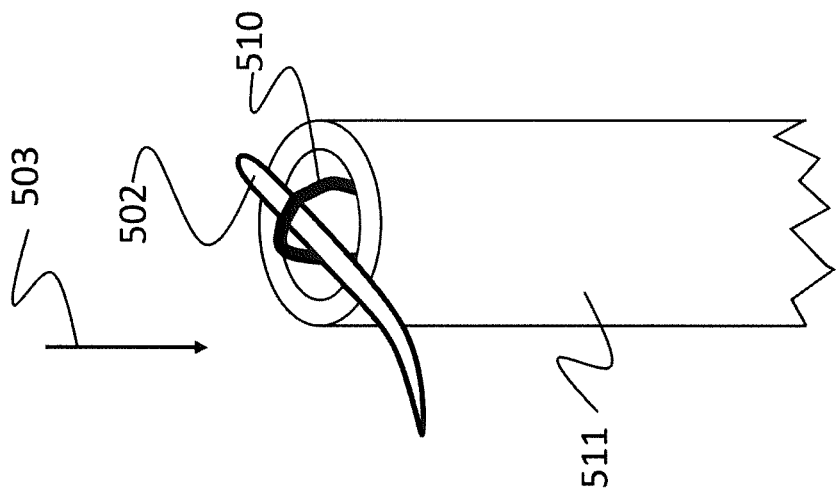
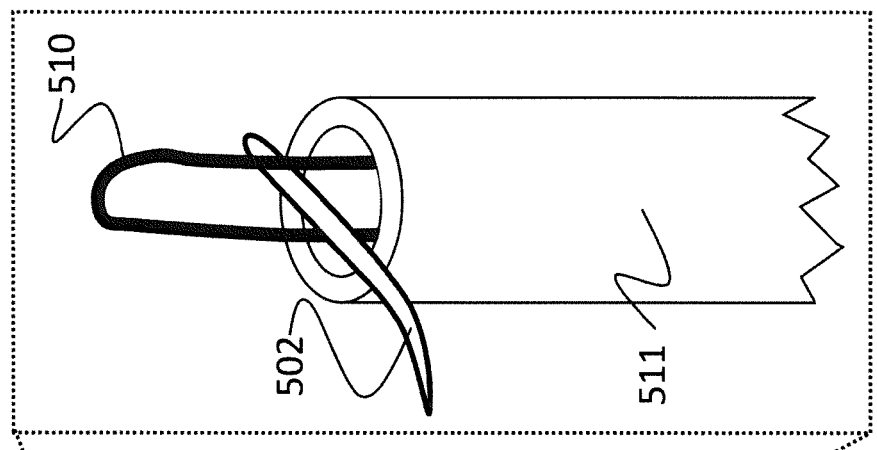
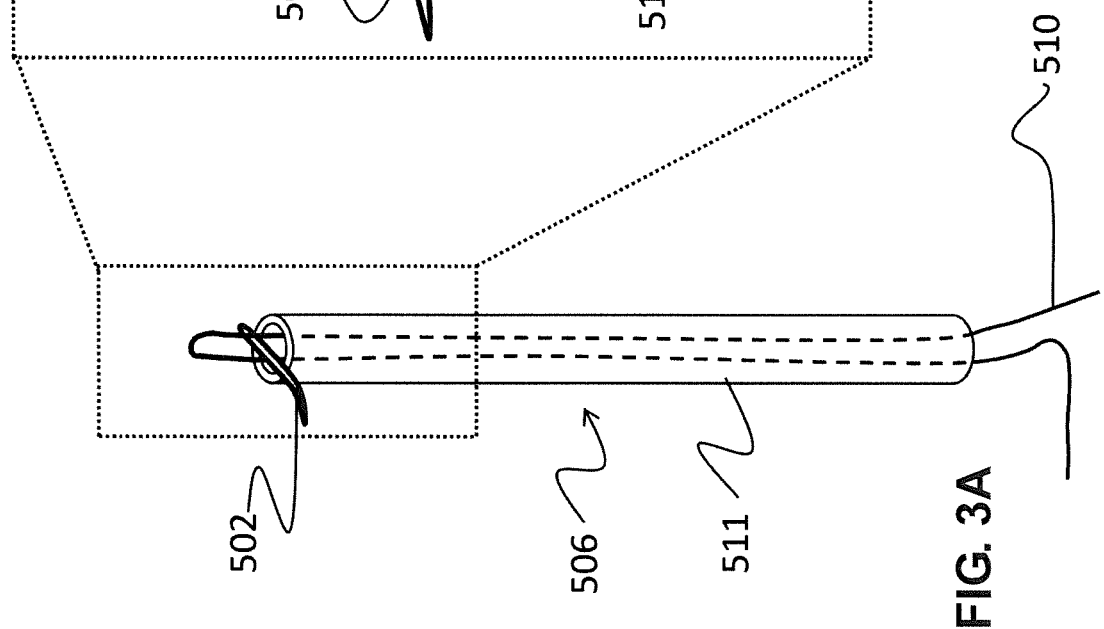
FIG. 3C
FIG. 3B
FIG. 3A

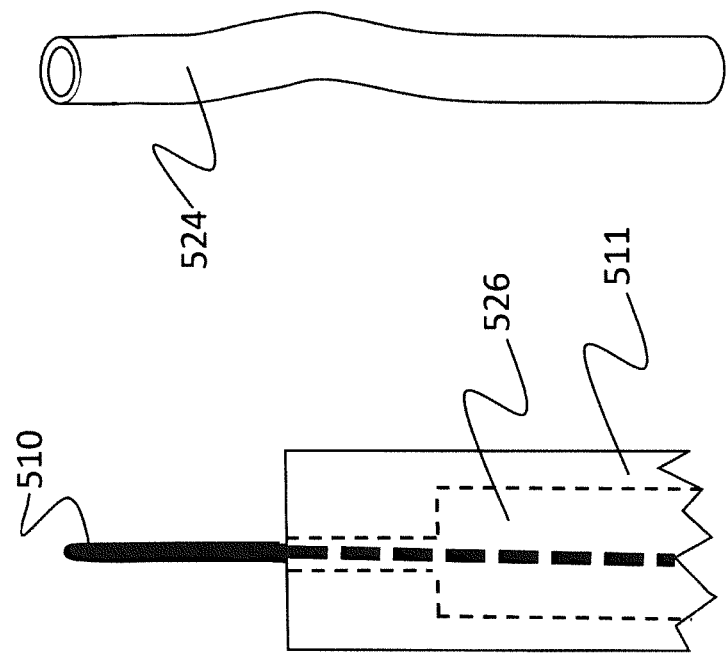
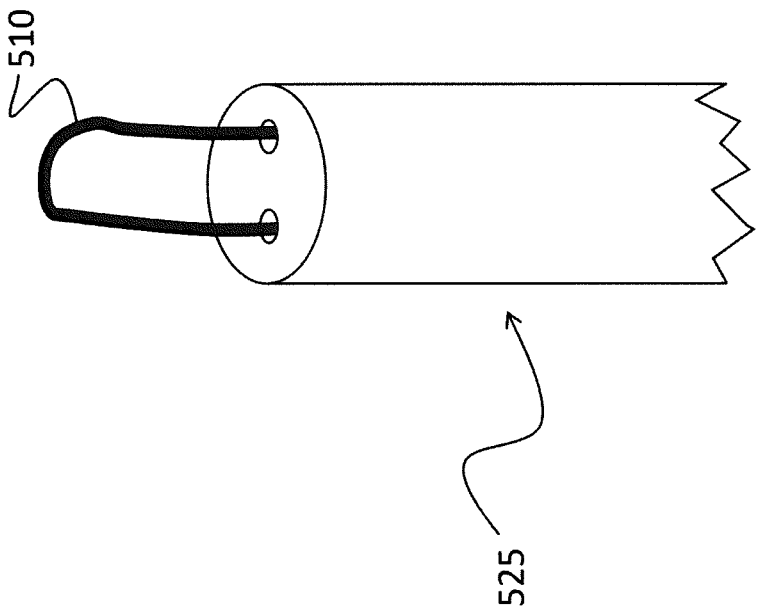
FIG. 7C
FIG. 7B
FIG. 7A

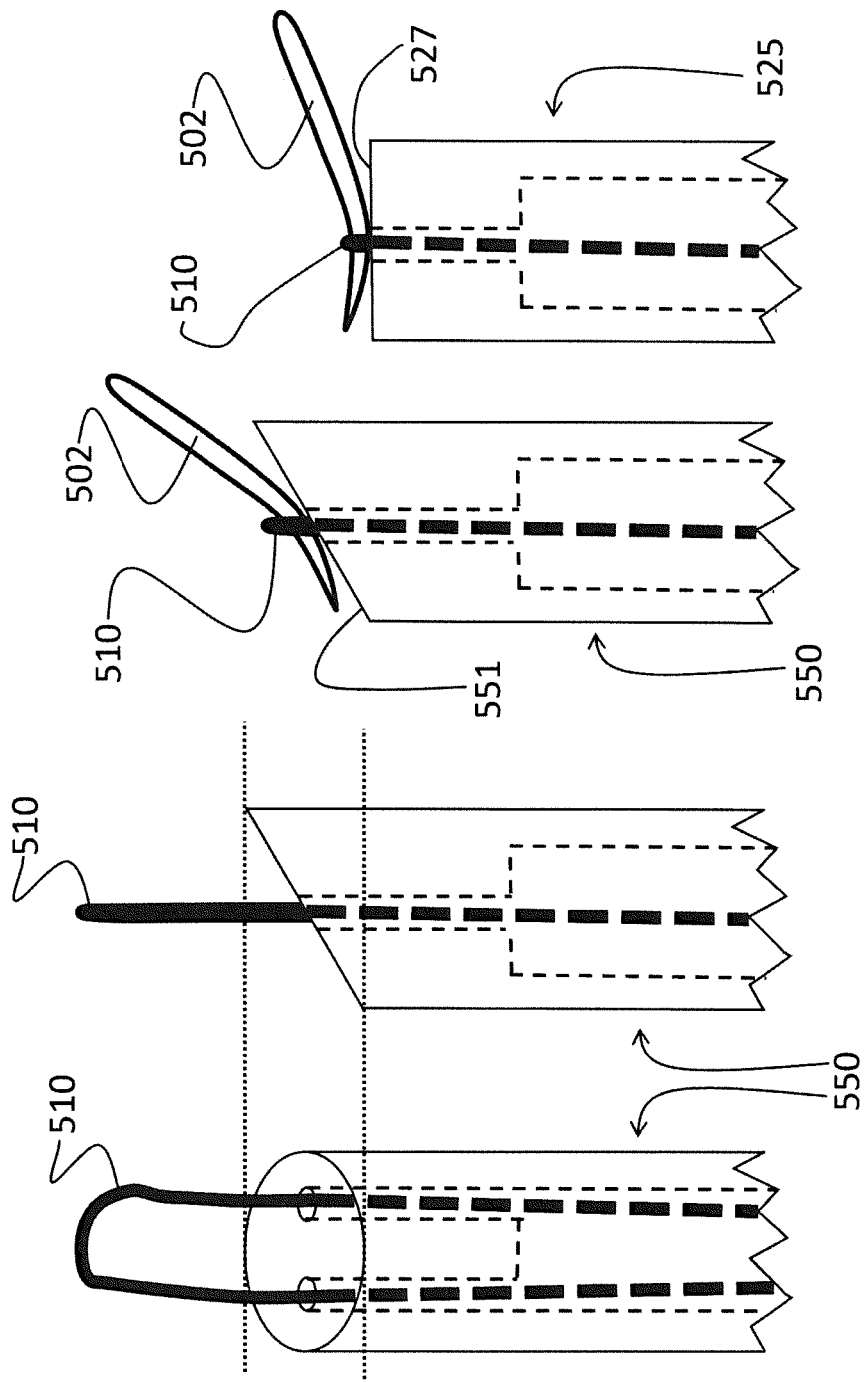

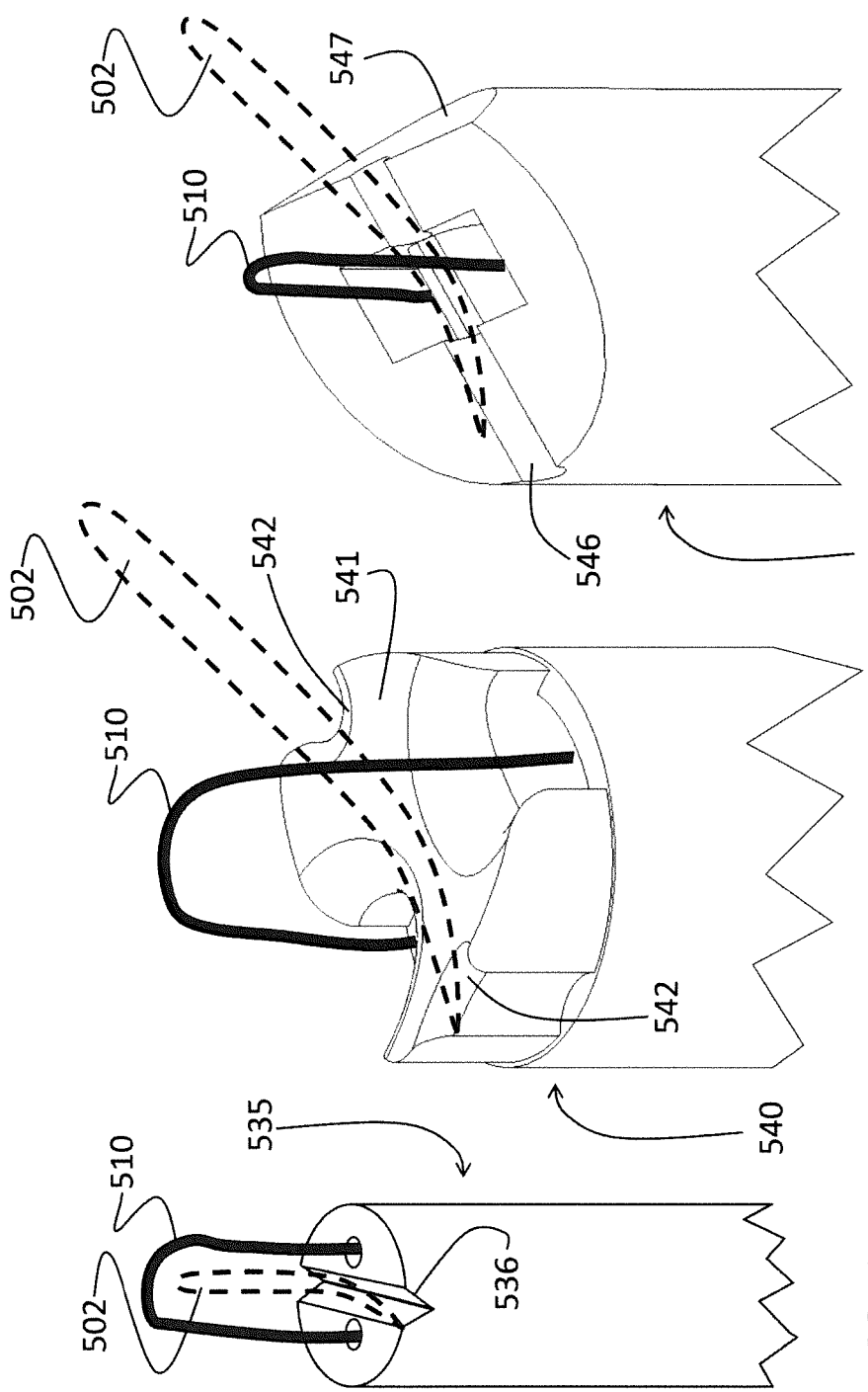

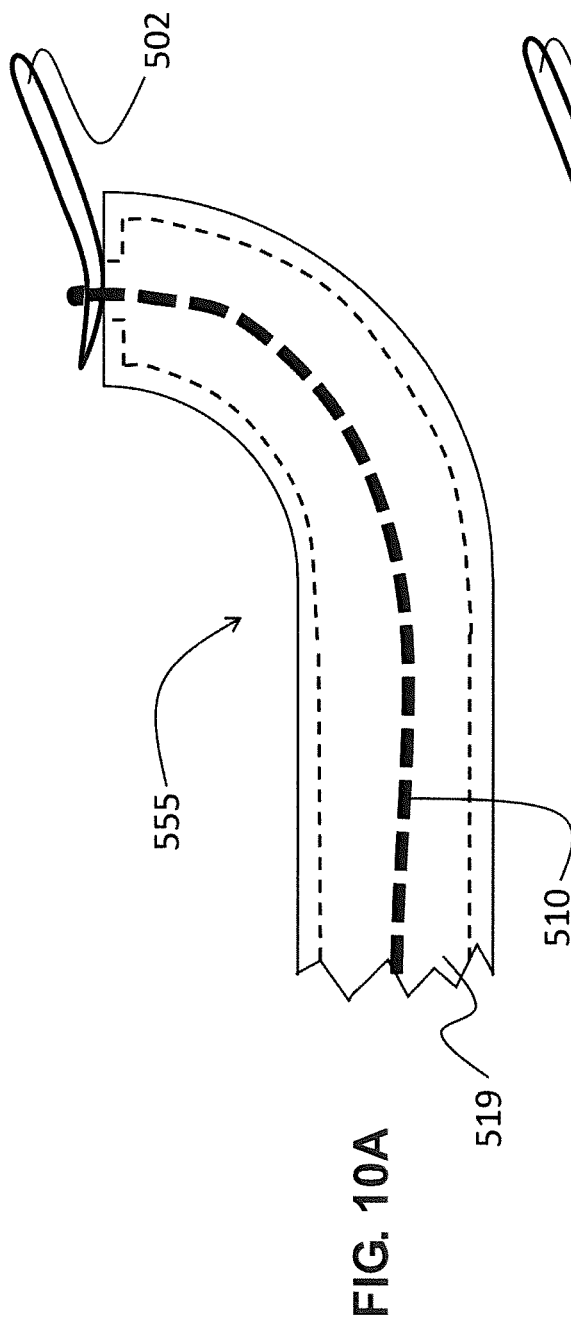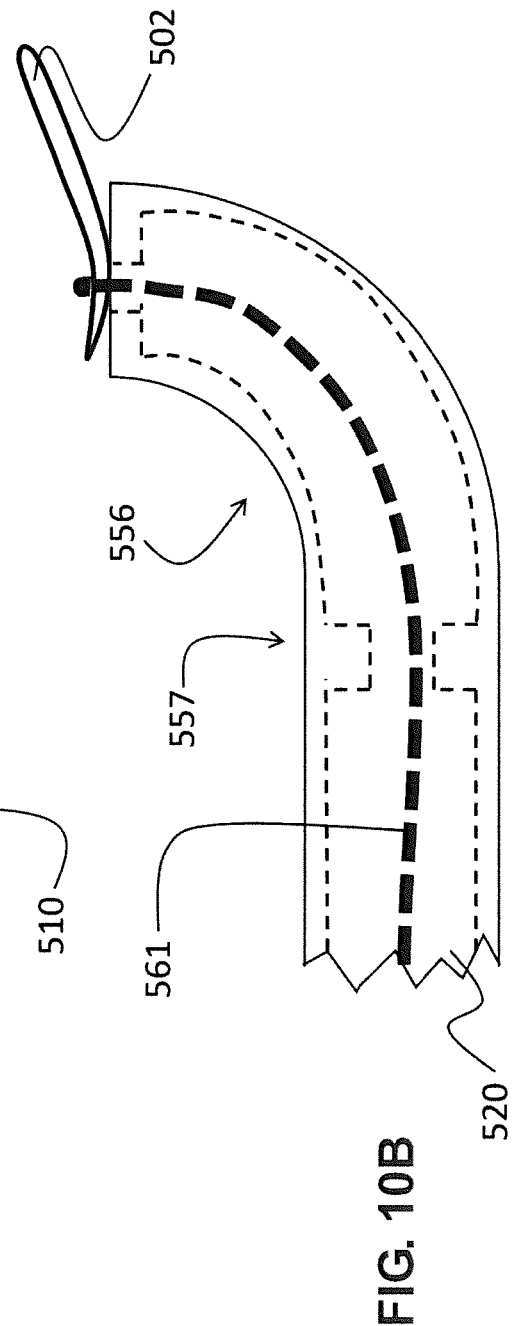

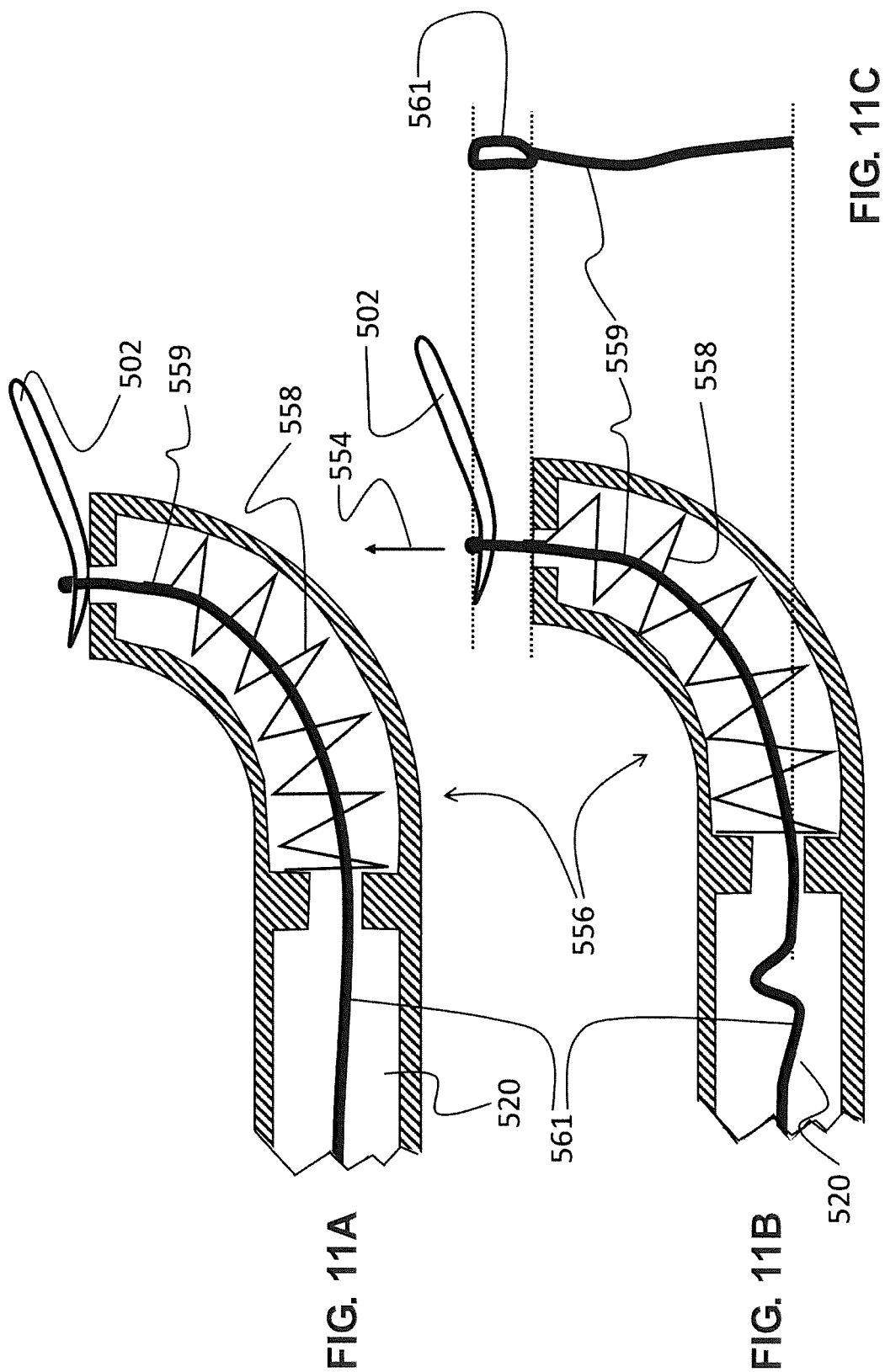

DEFORMABLE END EFFECTORS FOR COSMETIC ROBOTICS

CROSS-REFERENCE TO RELATED APPLICATIONS

This application represents the U.S. National Phase of International Application number PCT/US2017/061899, filed on Nov. 16, 2017 and titled "Deformable End Effectors for Cosmetic Robotics" which claims the benefit of U.S. Provisional Application No. 62/423,000, which was filed on Nov. 16, 2016 and titled "Machine for Beauty Salon". The entire contents of these applications are incorporated herein by reference.

FIELD OF THE INVENTION

The invention relates to the process of automatically applying eyelash extensions.

BACKGROUND OF THE INVENTION

Eyelash extensions are increasing in popularity all over the world. Eyelash extensions are usually differentiated from what is called an "artificial eyelash" or an "artificial eyelash structure" by the fact that they are affixed one to one to a natural eyelash fiber. An "artificial eyelash" is a complete set of eyelash fibers (usually for one eye) that is connected to a backing material (a thin strip at the proximal end of the eyelash fibers), which is affixed to the eyelid. This process is therefore simpler and is provided for home use. Eyelash extensions, however, are laboriously glued, usually with a cyanoacrylate adhesive, to each natural eyelash fiber one at a time by a beauty technician. Extensions may have branches, such as shown in U.S. Pat. No. 8,127,774, and there are some schemes for interlocking with nearby eyelashes, such as disclosed in U.S. Pat. No. 8,113,218.

When eyelash extensions are applied for the first time, the appointment can take a considerable amount of time, lasting up to two hours. During an appointment, each eyelash extension must be picked up in the proper orientation with tweezers, dipped in adhesive, and then placed against one of the subject's natural eyelash fibers until adhesion occurs. Because this large amount of labor costs beauty salons money, and because the length of time required and cost deters some customers, there have been some labor-saving devices proposed. One such device is a dispenser for eyelashes that is held in the hand, disclosed in U.S. Patent Application Publication No. 2014/0261514. There have also been labor saving proposals regarding the trays on which the extensions come from the factory, such as can be seen in U.S. Pat. No. 8,701,685. These trays are intended to combat the fact that it is not only the adhesion step of the process which is difficult for humans. Just picking the eyelash extensions up with a pair of tweezers is challenging. Also, it has been proposed that the handling of adhesive and the step of dipping the extension into adhesive can be eliminated by providing each extension with a pre-installed piece of heat shrink tubing which is used to affix the extension to the natural eyelash fiber. The invention described here applies to all eyelash extensions, whether branched, interlocked, or otherwise, and to all methods of adhesion to the natural eyelash, whether by adhesive, heat shrink tubing, or otherwise.

There is a need, therefore, for a way to more effectively install eyelash extensions, which would reduce both the time and the cost of doing so. Furthermore, there is a need that such a system should be demonstrably safe so that the recipient of the extensions is confident in the procedure. It is very difficult to create a robotic system which is in contact with a human but can be guaranteed to safe. The robotic system disclosed here provides such safety but does it in a way that is much lower cost than what is normally called "intrinsically safe" or "collaborative" robotics. Safety is typically guaranteed on such systems through the use of redundant feedback (to eliminate axis runaways when a feedback device fails) and through extensive code review coupled with verification and validation testing of all software used on the system. Examples of such systems are the da Vinci® robot of Intuitive Surgical® Corporation of Sunnyvale, Calif. and the ARIAS® robot of Restoration Robotics™, Inc. of San Jose, Calif.

The ARTAS® robot, for example, is based on a version of an industrial robot arm which is expensive, but rated safe for human-robot collaboration. Furthermore, all software which could result in an unsafe situation to the nearby human needs to be meticulously reviewed and tested. This unfortunately raises costs again and cuts the programming staff off from reusing most commercial and open source software libraries and tools. It is hard to guarantee the safety of such software, and, for medical devices, it is considered "Software of Unknown Provenance" by regulating bodies such as the U.S. FDA and is almost impossible to use in any application affecting human safety.

The invention described here addresses this issue by using a novel strategy to make a robot which is in contact with a human safe. It is applicable not only to the job of eyelash extensions but also to other procedures performed on a human subject that could be done by a robot.

SUMMARY OF THE INVENTION

The installation of eyelash extensions can be automated with robotic mechanisms that place the extension without requiring manual application by a human. Unless, however, extremely expensive and complex fail-safe robotic mechanisms are used, a safety system should be provided to ensure the safety of the extension process in the event of a robotic malfunction. The subject of this invention is the combined use of inherently safe end effectors and safety barriers attached to robotic mechanisms. A particular end effector that can grasp eyelash extensions and operate near a human face without risk of injuring the human if the end effector contacts the human is also disclosed. This invention also applies to other areas of cosmetics, and embodiments relating to inherently safe operation in laser skin procedures, tattooing, airbrushing, among others, are presented.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 3A shows the simplest embodiment of the invention in the form of an inherently safe end effector.

FIG. 3B is an enlarged view of a portion of FIG. 3A.

FIG. 3C shows the end effector grasping an eyelash extension.

FIG. 7A shows an alternate tip for the end effector that better supports the eyelash extension.

FIG. 7B is a side view of the alternate tip.

FIG. 7C shows a bent tube for use with the alternate tip.

FIG. 8A shows another variation on the end effector tip that allows for an alternate orientation of the eyelash extension.

FIG. 8B is a side view of the end effector tip of FIG. 8A.

FIG. 8C shows the end effector tip of FIGS. 8A and B grasping the eyelash extension.

FIG. 8D shows the end effector tip of FIGS. 7A and B grasping the eyelash extension.

FIG. 9A depicts another embodiment with changes in the end effector tip to better secure the orientation of the eyelash extension.

FIG. 9B depicts another embodiment with changes in the end effector tip to better secure the orientation of the eyelash extension.

FIG. 9C depicts another embodiment with changes in the end effector tip to better secure the orientation of the eyelash extension.

FIG. 10A shows an elbow end effector, which permits a distal 90-degree right turn, reorienting the eyelash extension even further.

FIG. 10B shows a sprung elbow end effector, which overcomes the frictional limitations associated with the elbow end effector of FIG. 10A.

FIG. 11A shows the sprung elbow end effector in more detail.

FIG. 11B shows the sprung elbow end effector with tension released from a cord.

FIG. 11C is a partial front view of a looped cord of the sprung elbow end effector.

DETAILED DESCRIPTION OF THE INVENTION

There are several embodiments of the invention. Discussion will begin with background for comparison and a rather simple embodiment for eyelash extension. Next, various improvements to the eyelash extension end effector will be discussed, followed by discussion of a variation using electrostatic gripping. Then, several embodiments using the same basic safety system for other cosmetic applications will be presented. Finally, an exemplary embodiment for use with eyelash extension is given.

The following description sets forth numerous specific configurations, parameters, and the like. It should be recognized, however, that such description is not intended as a limitation on the scope of the present invention but is instead provided as a description of exemplary embodiments.

In the following description, when the term "eyelash" is used, it is meant to refer to one or more natural eyelash fibers of a person. When the term "eyelash extension" or "extension" is used, it is meant to refer to an artificial eyelash extension.

Background and Simplest Embodiment

Figure 1:
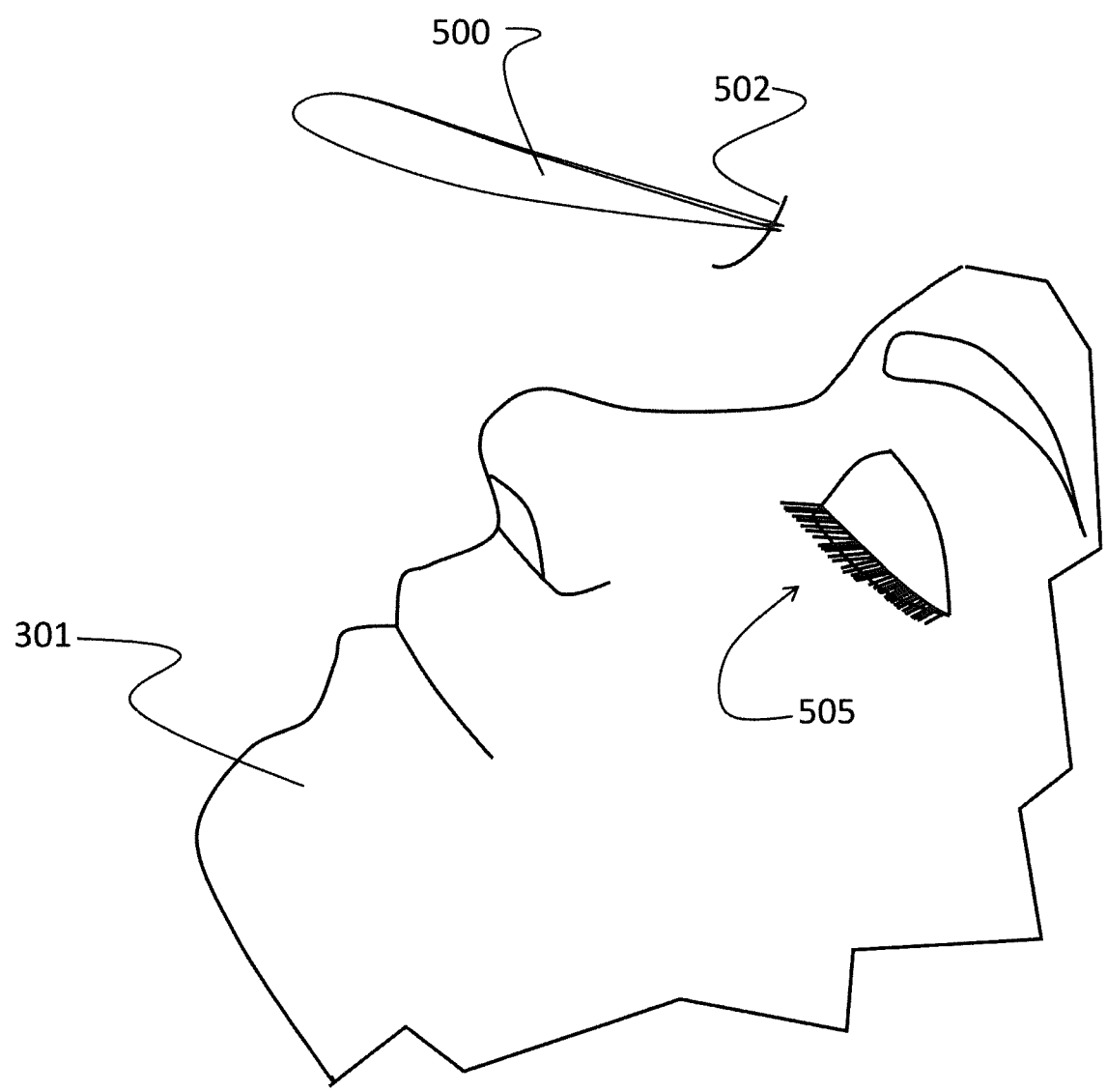
FIG. 1 shows manual eyelash extension.

Consider initially FIG. 1, which is a rather simple figure indicating the present method of eyelash extension. In this process, a cosmetologist (not shown) uses tweezers 500 to manipulate an eyelash extension 502. After applying adhesive to eyelash extension 502, the cosmetologist aligns eyelash extension 502 to a natural eyelash of eyelashes 505 of a subject 301 and waits until the adhesive cures. Safety in this operation is assured by the training of the cosmetologist who has spent many hours learning to apply extensions to purpose-made mannequins. Yet, the hazards associated with operating tweezers 500 in close proximity to the eye of subject 301 are obvious: even a slight grazing of the eye with the razor-sharp tweezers used in eyelash extension could cause serious injury.

Figure 2:
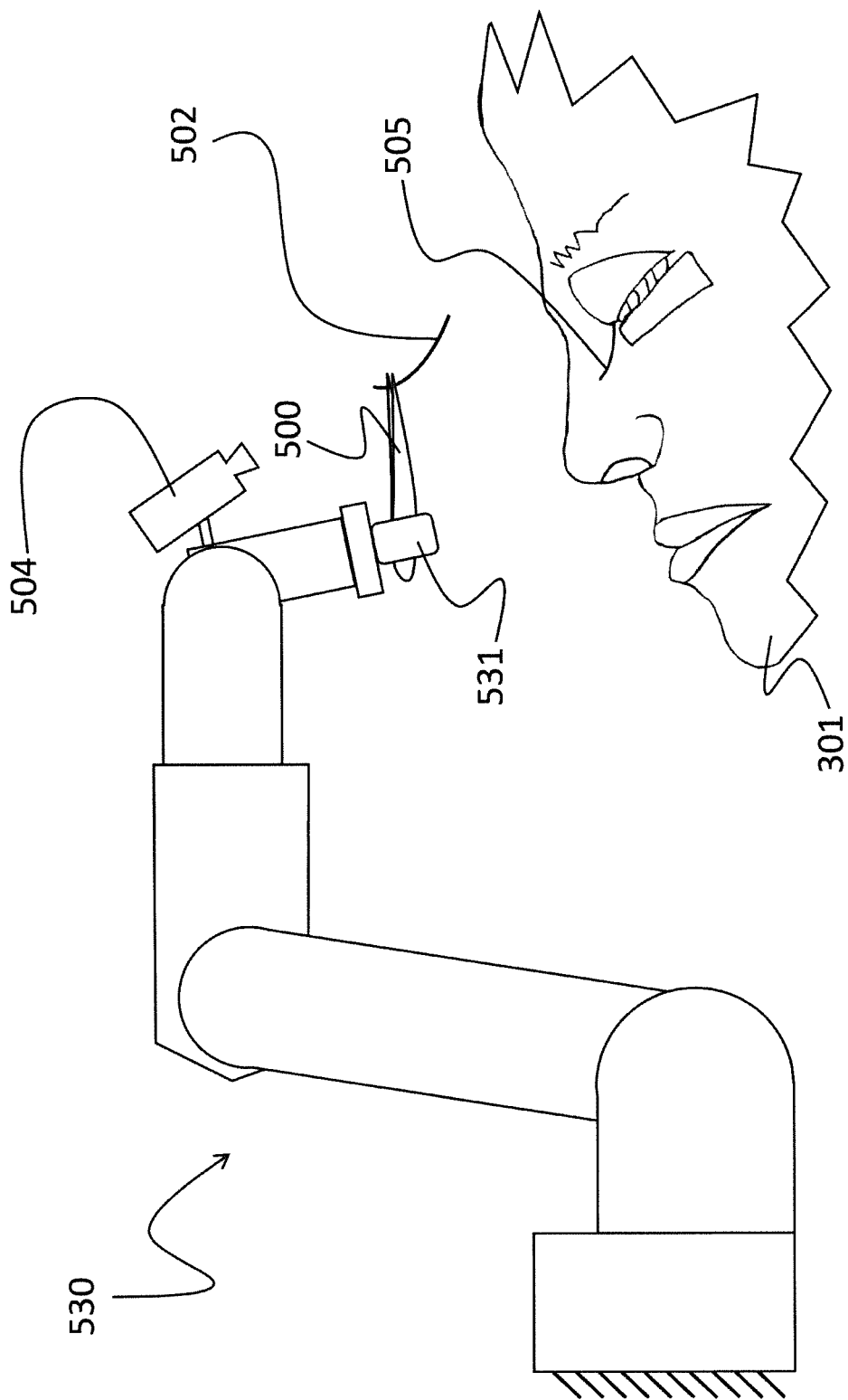
FIG. 2 shows a six-axis robot performing automatic eyelash extension.

Advances in robotics and computer vision have now made it possible to contemplate automating eyelash extension. Although not specifically the object of this invention, a brief recitation of the principal features of such a system will be helpful, and a system is diagrammed in FIG. 2. Here, a robot 530 is comprised of six actuators roughly approximating a human arm. Such configurations are common in the field of robotics and are often referred to as six-axis robot arms. Robot 530 terminates in a tweezer mount 531 which mounts and actuates tweezers 500 to robot 530. In this design, tweezers 500 are simply the same as would be used by a cosmetologist. Tweezers 500 grasp eyelash extension 502, and robot 530 aligns eyelash extension 502 alongside a single eyelash of eyelashes 505. A computer vision system 504 provides an accurate position of eyelashes 505.

Providing safety for this design involves ensuring that robot 530 does not accidentally push tweezers 500 into the head—and especially not into the eye—of subject 301. Such robots exist. For example, surgical robots have become increasingly common in recent years and are used with sharp surgical tools inside patients. Yet, there are several difficulties with such a design. First, great redundancy should be built into the hardware systems; typically, redundancy in sensing and computing are provided at a minimum. This adds cost and complexity to the robot. Second, greater care should be taken with the software; the processes to produce safety critical software are well understood but take great amounts of time, greatly increasing development costs. Thirdly, many such systems are operated directly by a human and do no operate autonomously, adding a layer of safety because the human operator can check the behavior of the robot. Finally, such processes generally preclude more sophisticated computing techniques such as machine learning and artificial intelligence—exactly the types of sophisticated techniques often used with computer vision. This is because it can be difficult to prove that such techniques work correctly and will continue to work correctly under all circumstances.

For these reasons, it would be desirable if there was a way to use a cheaper, more conventional robot to perform light cosmetics-type work without sacrificing safety. That is, can an intrinsically safe robot be designed that does not incur these additional difficulties? After all, there exist a great many relatively cheap, small robots built for industrial applications that can perform tasks such as eyelash extension, but the limitation in their application is the desire for sufficient safety for use around a human. The invention disclosed herein is a device that solves this problem for the small and light payloads needed in cosmetic applications. Of course, it should be noted that there are many approaches to safety that may be used, either singly or in conjunction with the embodiments disclosed here, to provide a desired level of safety to the subject.

Consider FIGS. 3A-C, which show a rather simple embodiment of the invention. An end effector 506 is comprised of a tube 511 and a cord 510. Cord 510 comprises any moderate tensile strength cord capable of sustaining tight bends. For example, synthetic threads, monofilament fishing line, and stranded fishing line are all, without restriction, examples of such a cord. By forming a loop at the top of cord 510 and threading this loop over eyelash extension 502, as shown in FIG. 3B, and then pulling cord 510 tight over eyelash extension 502, as shown in FIG. 3C, eyelash extension 502 can be grasped by end effector 506. Because end effector 506 is intended only to pick up eyelash extension 502, it need not possess large structural rigidity. Indeed, the weight of eyelash extension 502 is so little that it is negligible in comparison to the weight of end effector 506. It is preferred that the main structural component of end effector 506, that is tube 511, be made of a thin polymer. For example, low density polyethylene tubing that is slightly rigid or polypropylene tubing are both good choices. Indeed, it was found that common cocktail straws, made of polypropylene, are excellent choices, but any resilient material used with a small enough section that tube 511 is rigid only when lifting its own weight plus that of eyelash extension 502 will be sufficient. The diameter of tube 511 should be large enough to pass cord 510 and small enough that eyelash extension 502 rests across the diameter of tube 511. In practice, diameters around 0.1 inches (about 2.5 mm) are very effective, but this is meant as an illustrative example and is not intended to restrict the scope of the invention. Furthermore, tube 511 can be a non-circular or non-closed section and, indeed, is intended to be any type of strut—for example, a square tube or "C" section would generally work as well.

Figure 4:
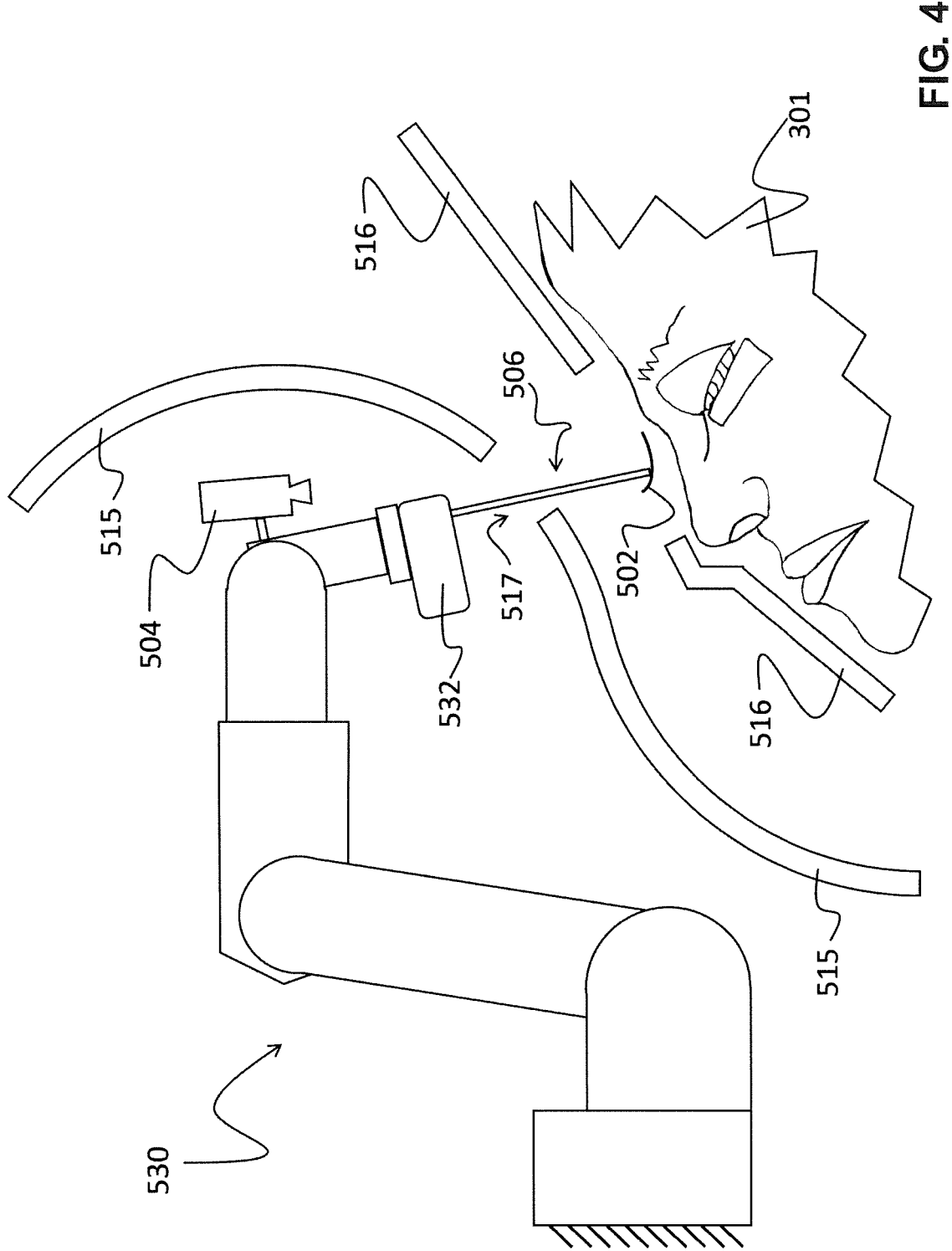
FIG. 4 shows the end effector in use with the robot.

End effector 506 is shown in use in FIG. 4. Here, robot 530 has been retrofitted with a tube mount 532, which connects end effector 506 to robot 530. End effector 506 protrudes though a physical barrier 515 at a gap 517, but neither tube mount 532 nor robot 530 can fit through gap 517. Therefore, it is simple to see that subject 310 is protected from all parts of robot 530 except end effector 506. Physical barrier 515 is a first example of a safety barrier and can be made from any material sufficiently strong to resist the maximal impact of robot 530—metals and high impact plastics like polycarbonate are very suitable. In some embodiments, where gap 517 is not large enough, it is simply a matter of creating a larger feature on robot 530 or on tube mount 532 and enlarging gap 517 a corresponding amount. In some embodiments, a human limiter 516 is provided to prevent subject 301 from approaching too close to physical barrier 515. This can be desirable if gap 517 is enlarged because it may be possible for a corner of robot 530 to reach through gap 517 even if robot 530 cannot fit all the way through gap 517. Thus, robot 530, end effector 506, physical barrier 515, and human limiter 516 comprise an intrinsically safe robotic system even though robot 530 is not, in itself, intrinsically safe for human use. It will be seen in future embodiments that some of these components can be omitted in specific embodiments and can include specific extensions in others, but that, in general, it is possible to retrofit a robot to become intrinsically safe with the proper end effector and barriers.

Figure 5:
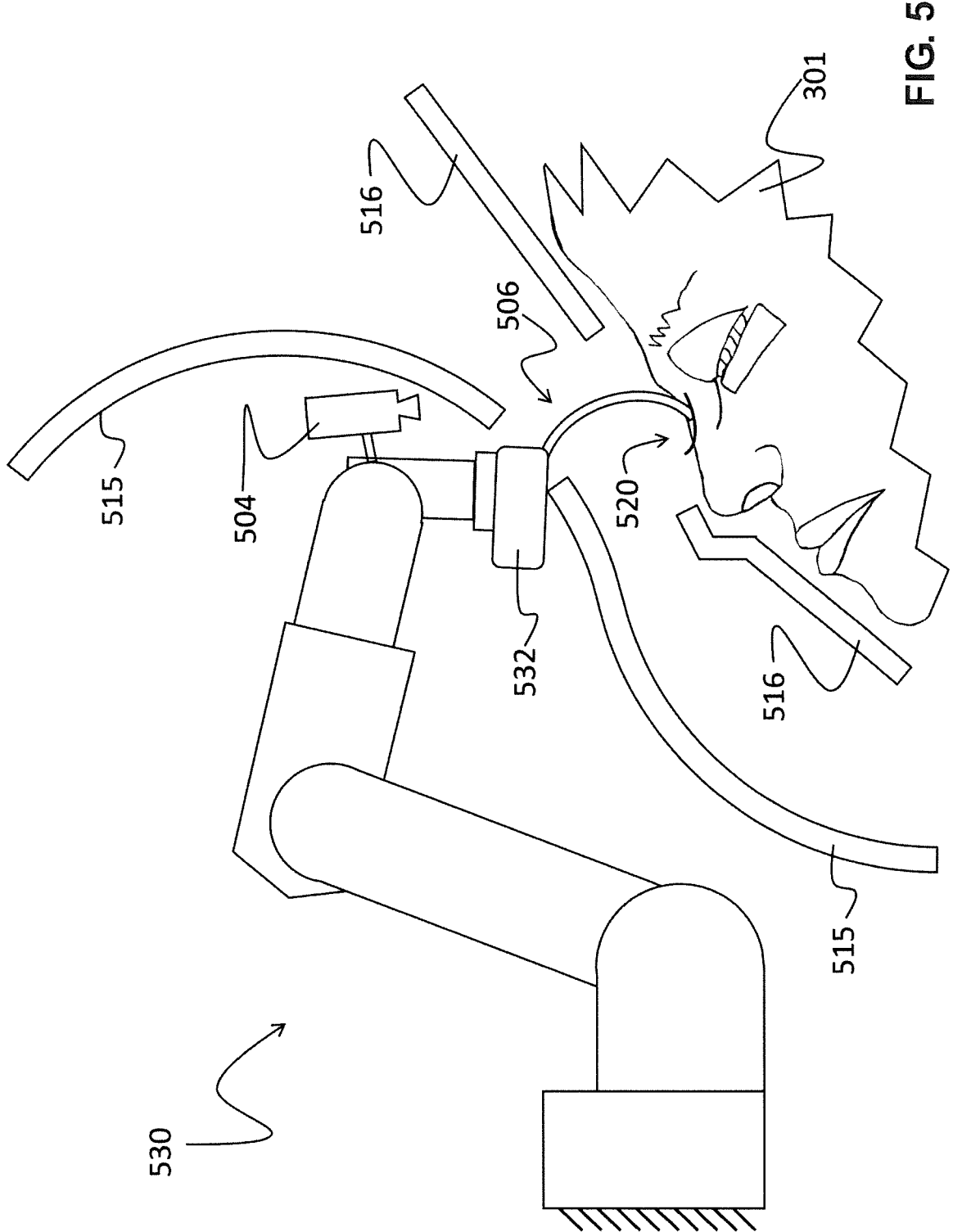
FIG. 5 shows a runaway condition where the robot has malfunctioned, but the subject remains safe due to the use of the end effector.

FIG. 5 shows the outcome in a situation where robot 530 has inadvertently contacted subject 301 with end effector 506 at a contact point 520. Although good practice in robotic design should limit such an occurrence, it is well understood in the art that, in the absence of the extreme precautions taken in, for example, robotic surgery devices, end effector 506 might contact subject 301 at some point. However, because end effector 506 is made from a light, flexible plastic, end effector 506 simply bends, causing no more than a trivial injury to subject 301. Furthermore, robot 530 has contacted physical barrier 515, which prevents further motion. Therefore, the embodiment of FIG. 5 shows an inherently safe robotic system for use adjacent to a human subject where the safety is provided by mechanical means rather than redundancy and strict software controls.

Figure 6:
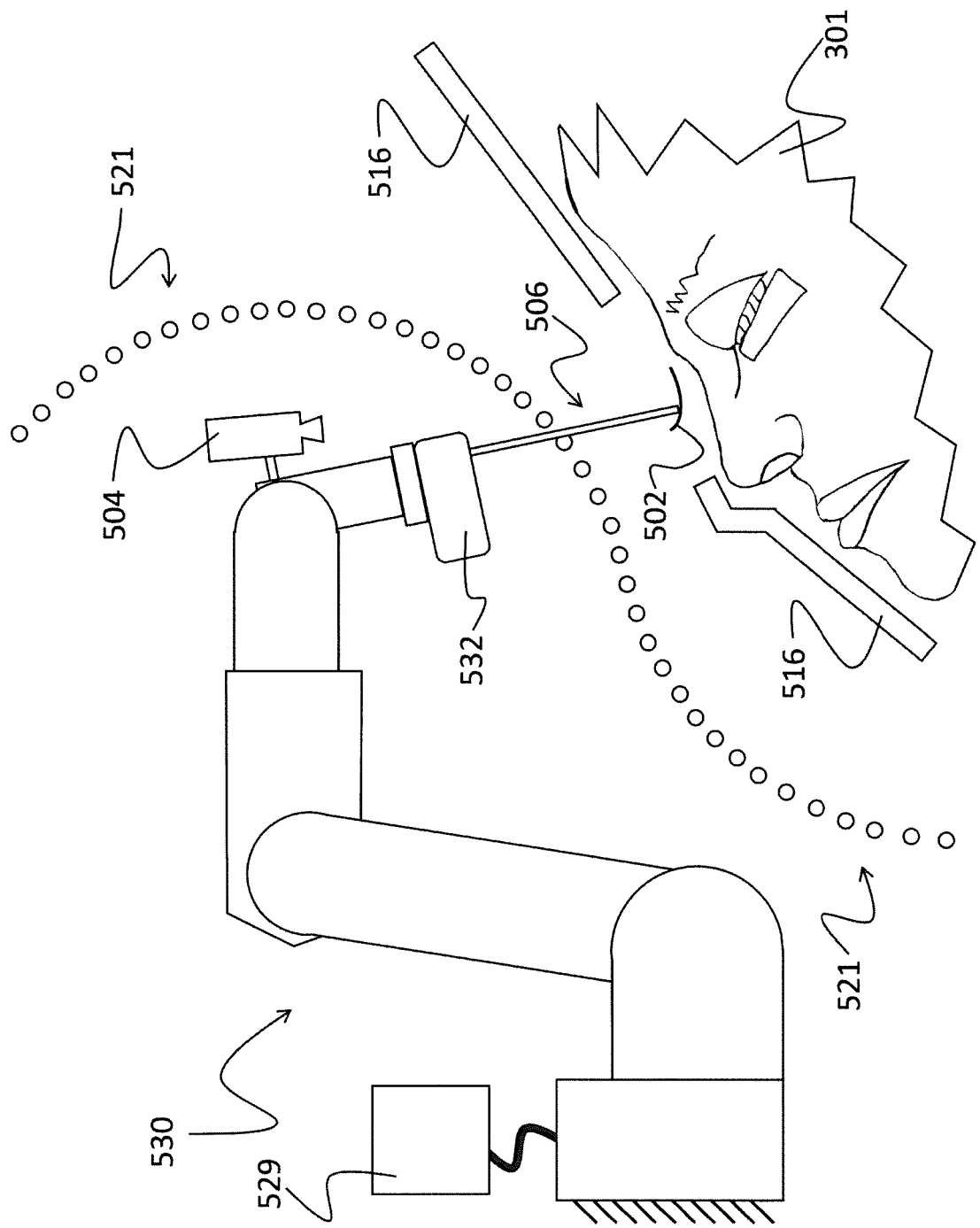
FIG. 6 depicts an alternate embodiment using a light curtain in place of a physical barrier.

In another embodiment shown in FIG. 6, physical barrier 515 has been replaced by a light curtain 521, which is a second type of safety barrier. Light curtains are well understood in the art of automated equipment, comprising a series of light emitters paired with receivers. In FIG. 6, each circle in light curtain 521 represents one pair of emitters and receivers seen end on. In typical operation, light curtain 521 cuts power (or engages other safety systems) when a single pair of lights is broken. However, in this embodiment, it is desired that end effector 506 should pass through light curtain 521 without triggering light curtain 521 while robot 530 and tube mount 532 do not. This can be achieved by allowing the light path between no more than one pair of emitters and receivers to be broken at any one time (or some other pre-defined number of emitters and receivers). In this way, it is possible to cut power (or engage a safety system) if robot 530 attempts to exit its allowed region of operation without needing a physical barrier. Such a light curtain can be built by counting the number of broken paths either with a hardware or software circuit provided that the software itself meets safety-critical standards. In some embodiments, a hybrid approach of physical barriers, as in FIG. 5, and light curtains, as in FIG. 6, is used. In some embodiments, light curtain 521 is preferred because it does not interfere with computer vision system 504.

In general, robot 530 is provided with a controller 529. As controllers for robotic mechanism are well understood in the art, controller 529 is omitted from other figures showing various robots. However, it is understood that controller 529 represents, without loss of generality, the electronics and computing equipment used for the control of robot 530. This includes the power electronics used for controlling the various motors and actuators of the robot. Furthermore, controller 529 is configured to communicate with the cameras used by computer vision system 504 and any sensors used by robot 530. Controller 529 further includes a computing system that can be comprised, without limitation, of one or more of: a microcontroller, a microcomputer, a microprocessor, a field programmable gate array (FPGA), a graphics processing unit (GPU), or an application specific integrated circuit (ASIC). Controller 529 includes the software used to coordinate the motion of robot 530 with data received from computer vision system 504 and then to carry out the motions described during eyelash extension and various other cosmetic procedures described below. Various light curtains described here can be in communication with controller 529 or can comprise a separate system to ensure safety. In some embodiments, controller 529 is part of computer vision system 504. In other embodiments, computer vision system 504 includes its own processing. In general, computer vision system 504 here is intended to include any sensor or group of sensors configured to image the environment in 2D or 3D. The use of a computer vision system to visually coordinate the motion of a robot and/or end effector is often referred to as visual servoing. In such a visual servo system, robot 530 uses information from computer vision system 504 to correct its internal positional model, which is otherwise typically created through joint positional sensors. The advantage is that the joint positional sensors add error at each joint, with additional error accumulating with each additional joint of the robot, where computer vision system 504 is an absolute measurement of output position. In some embodiments, controller 529 can be used for computer vision system 504 and robot 530, or specialized computing systems in communication can be used for each.

End Effector Improvements

There are various improvements that can be made to end effector 506. First, it should be noted (with reference to FIG. 3) that it is relatively easy to accidentally draw eyelash extension 502 into tube 511 if cord 510 is pulled too far. Because eyelash extension 502 is very flexible, it takes very little force to do this. Therefore, in the embodiment of FIGS. 7A and B, a flat anvil end effector 525 includes a flat top with two holes to allow passage of cord 510. This way, eyelash extension 502 cannot be pulled too far, and, indeed, higher forces applied to pull on cord 510 will allow for greater clamping forces to be applied to eyelash extension 502. In FIG. 7B, the side view of flat anvil end effector 525 shows the internal hidden lines and a cavity 526. The purpose of providing cavity 526 is simply to allow flat anvil end effector 525 to remain low mass and for tube 511 to have a low buckling strength making it safe. However, cavity 526 should be small enough to not allow cord 510 to buckle when cord 510 is pushed upon to release eyelash extension 502. If the diameter of cavity 526 is small enough and cord 510 is stiff enough, it has been found that pushing very slightly on cord 510 will break the friction between cord 510 and the small holes at the tip of flat anvil end effector 525. This will free eyelash extension 502 and is a very rare occasion where it is useful to push on a string.

In another embodiment, tube 511 can be bent to create a bent tube 524, as shown in FIG. 7C. The advantage of bent tube 524 is that the slight pre-bend dramatically reduces the force required to collapse bent tube 524 (sometimes this force is referred to as the "columnar strength" of the tube) should bent tube 524 impact subject 301. Of course, releasing eyelash extension 502 is slightly more difficult in this case because of the slight friction imparted on cord 510 as it passes through the holes in flat anvil end effector 525.

FIGS. 8A-C show another variation. In some embodiments, it is preferable to present eyelash extension 502 at an angle. This can be achieved with an angled anvil end effector 550 shown in front and side view in FIGS. 8A and B. Because eyelash extension 502 will be tangent to an angled anvil surface 551 where cord 510 draws across eyelash extension 502 (see FIG. 8C), angled anvil end effector 550 holds eyelash extension 502 at an angle when compared to flat anvil end effector 525 (see FIG. 8D) with a flat anvil surface 527.

In yet another three embodiments, shown in FIGS. 9A-C, other anvil topologies have other advantages. In these figures, eyelash extension 502 is shown with a dashed line, and cord 510 is shown extended in order to preserve clarity. In FIG. 9A, a grooved anvil end effector 535 includes a groove 536 that locates eyelash extension 502. Testing indicated that grooved anvil end effector 535 produced especially reliable orientations of eyelash extension 502. FIG. 9B shows a saddle anvil end effector 540, which includes a saddle surface 541 providing a smooth resting place for eyelash extension 502, while notches 542 locate eyelash extension 502. FIG. 9C shows a notched anvil end effector 545, which includes both an angled anvil similar to the embodiment of FIGS. 8A-C and a groove in the form of a curved notch 546, which helps locate eyelash extension 502. Notched anvil end effector 545 also includes a chamfer 547, allowing for closer access to an operating surface. It should be noted that these embodiments are all approximately 0.1 inches in diameter. In general, it was found that the various grooves, whether sharp or curved in cross section, should have a cross sectional dimension roughly less than that of an eyelash extension. As the groove becomes much smaller, the groove tends to no longer "grip" the eyelash extension; as it becomes much larger, the cord no longer clamps the eyelash extension. Since eyelash extensions vary from 50 to 200 microns in diameter, a range of 5 to 150 microns across is preferred.

In some embodiments, it is desirable to present eyelash extension 502 at an even greater angle. This can be achieved, as shown in FIG. 10A, by providing an elbow at the end of the end effector. An elbow end effector 555 includes a 90-degree bend in a tube 519 near the end (it should be understood that the various tip embodiments discussed here can all include longer tubes such as that of end effector 506 even if these tubes are only partially shown in each figure). However, this design is problematic. At such a large angle, most materials used for cord 510 will tend to bind in the bend and not release eyelash extension 502 when cord 510 is pushed upon.

This shortcoming is addressed in an alternate embodiment, a sprung elbow end effector 556, which is shown without a spring in FIG. 10B. Sprung elbow end effector 556 includes an inner wall 557 included in a tube 520. More detail is included in the section view of FIG. 11A, showing a section through sprung elbow end effector 556. This view includes a spring 558, which produces a very small force, just enough to extend a looped cord 561. It should be noted that, because the diameter of sprung elbow end effector 556 is on the order of 0.1 to 0.2 inches in diameter, a very small compression spring is used to realize spring 558. However, such springs are readily available from manufacturers such as Century Spring™ Corporation of Commerce, California, and, indeed, such a spring can be found in most click action ball point pens. In FIG. 11A, looped cord 561 is shown under tension, being pulled to the left side of the figure, and clamping eyelash extension 502. Spring 558 is connected to looped cord 561 at a connection 559, and spring 558 is slightly compressed in this case. Additional tension is needed in looped cord 561 to counteract the force from spring 558, in addition to clamping eyelash extension 502. In FIG. 11B, the tension has been released from looped cord 561, and it has gone slack. This also allows spring 558 to extend slightly, pushing connection 559 in the direction of an arrow 554 and releasing eyelash extension 502. The topology of looped cord 561 is difficult to see in the side view, and so the partial front view of FIG. 11C is provided, depicting the configuration of looped cord 561.

Figure 12:
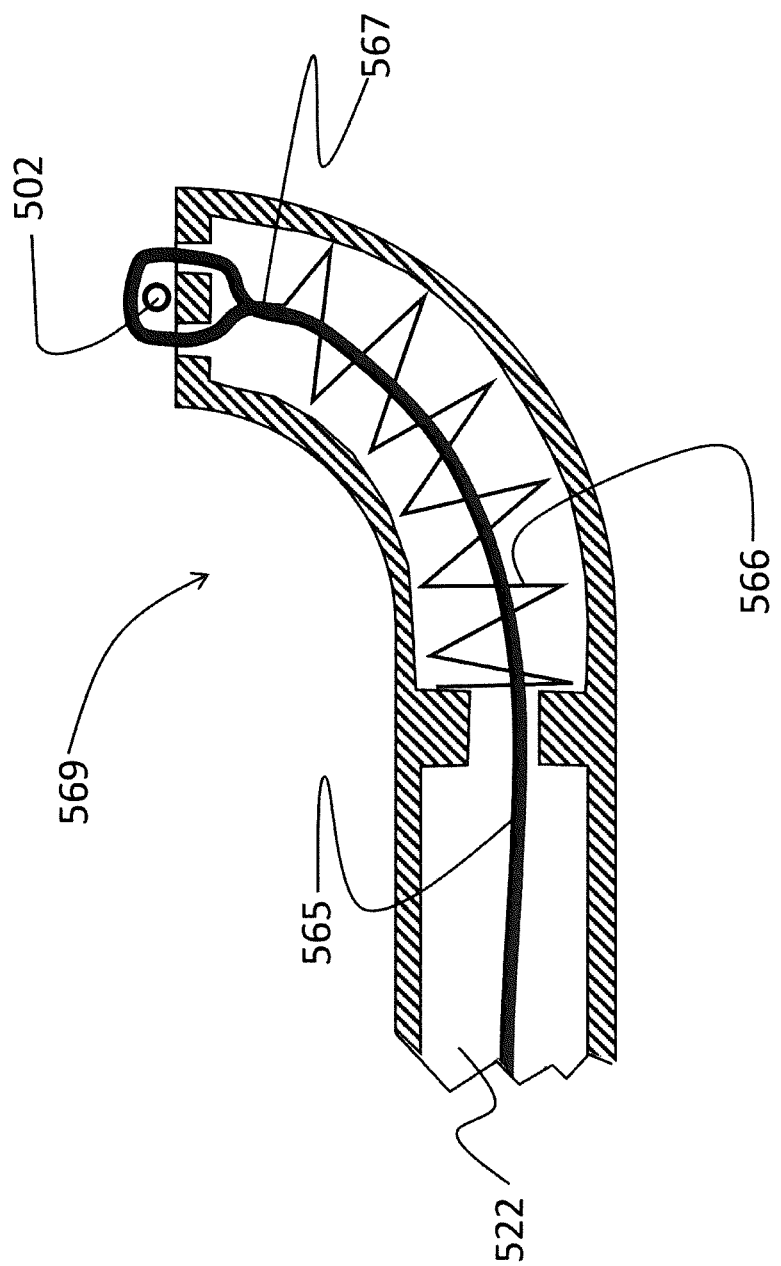
FIG. 12 shows a sprung elbow end effector variant, which provides yet another orientation option.

In some embodiments, it is further advantageous to provide a different end effector orientation by turning eyelash extension 502 by a further 90 degrees about a second axis to produce a sprung elbow end effector variant 569. Such a configuration can be achieved by radially rotating looped cord 561 in the embodiment of FIGS. 11A-C—the exact embodiment of sideways sprung elbow end effector 569 is shown in FIG. 12. This embodiment uses a cord 565 and a spring 566, which are tied together at a connection point 567. These elements are contained within a tube 522. It should be noted that the various anvil arrangements presented above are not necessarily mutually exclusive. For example, the angled or notched anvils presented above can be used with any of the elbow end effectors.

Several of the aforementioned embodiments provide ways to hold eyelash extension 502 at an angle with respect to the central axis of tube 511. This is useful because it can be desirable to grasp or place eyelash extension 502 at a particular angle, typically because of range of motion limitations in how tube 511 can be oriented. This is intuitively obvious—tube 511 is easy to orient because of its low mass, but reaching all possible orientations places undue burden on the range of motion of the robot. Also, in many embodiments, computer vision system 504 is also used, and it is advantageous to mount computer vision system 504 adjacent to an end effector. However, a straight end effector, such as end effector 506, can obscure eyelash extension 502 from the point of view of computer vision system 504. This is where the various elbow end effectors, such as sprung elbow end effector 556, are useful: the shaft of the tube is offset from the tip of the end effector, allowing for a clear view.

Figure 13:
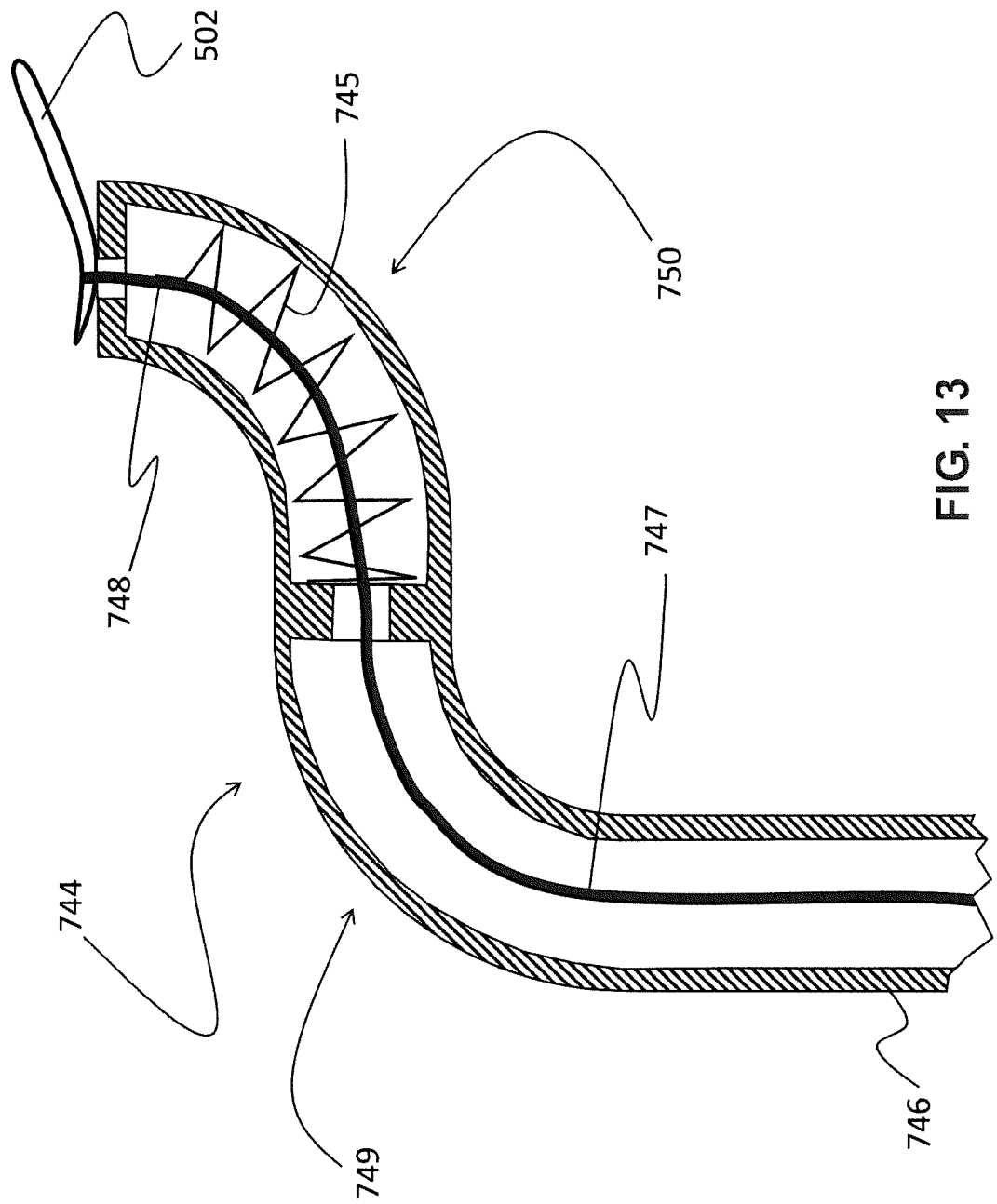
FIG. 13 shows a double elbow end effector, which provides reduced columnar strength with the same angular orientation as the end effector of FIGS. 3A-C.

Other variations to hold eyelash extension 502 can be used in order to ensure that the end of the end effector which is pointed towards the eye of subject 301 does not have a sharp tip. One such embodiment is shown in FIG. 13, where a double elbow end effector 744 is diagrammed. Here, a tube 746 is twice bent, with a spring 745 connected to a cord 747 at a connection point 748. This arrangement is similar to end effector 556, except for an additional bend 749. Doubled elbow end effector 744 is useful when a grasping orientation of eyelash extension 502 similar to that produced by flat anvil end effector 525 is desired. But, doubled elbow end effector 744 has the additional benefit that the double bend reduces the total columnar strength, decreasing the contact force with subject 301 necessary to bend tube 746.

Figure 14:
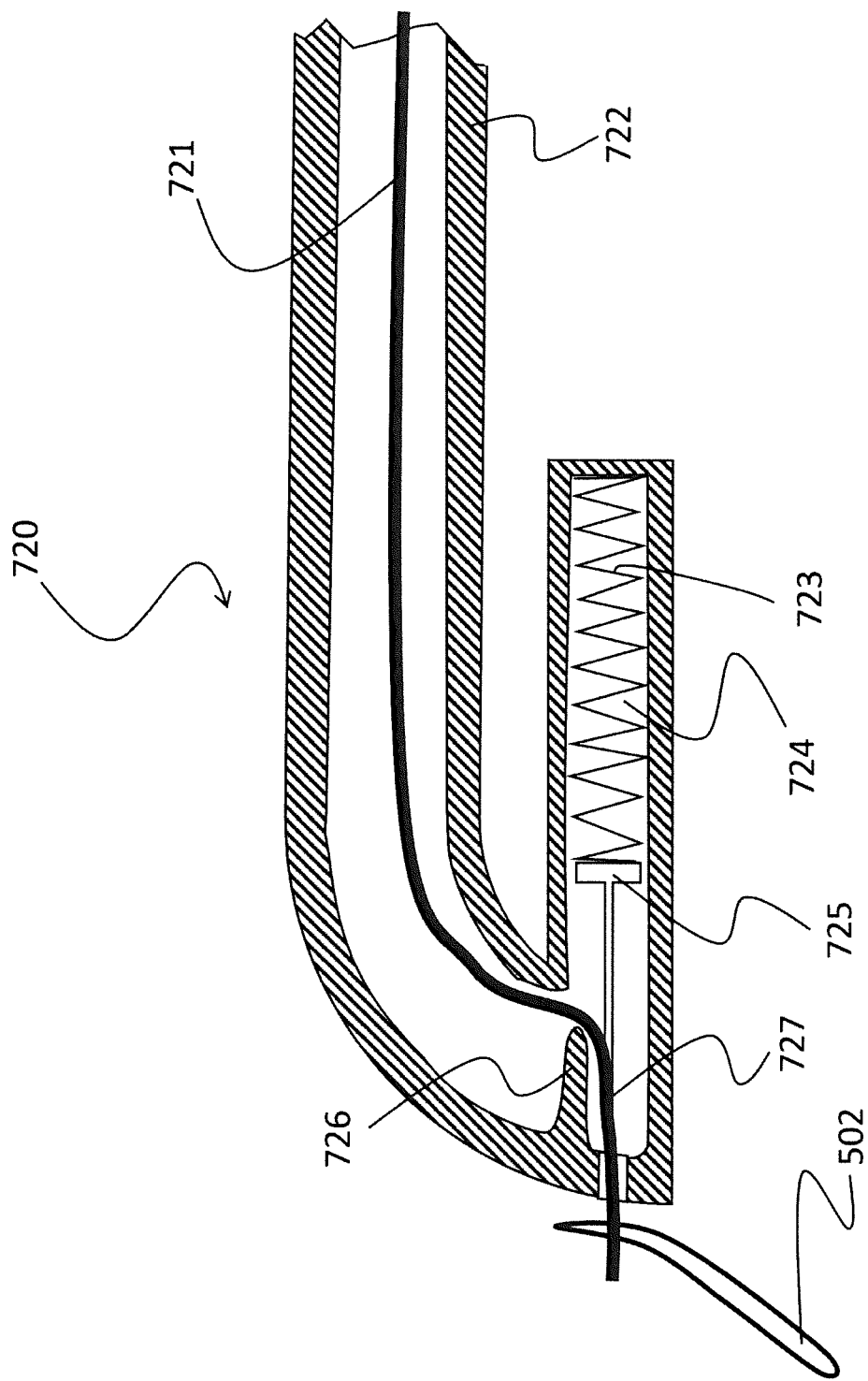
FIG. 14 shows a direct spring elbow end effector, which is a variation on the sprung elbow end effector of FIG. 12.

Another variation on the elbow end effectors is a direct spring elbow end effector 720, shown in FIG. 14. Here, a tube 722 includes a spring cavity 724, which contains a spring 723, which is a compression spring as in previous embodiments (although one skilled in the art will note that it is possible to reconfigure this embodiment to use a tension spring). Spring 723 pushes a plunger 725, which is joined to a cord 721 at a connection point 727. As a result, cord 721 is biased to push out from tube 722 and release eyelash extension 502 unless cord 721 is maintained in tension—like previous embodiments. An interior wall 726 is provided so that cord 721, when in tension, pulls generally along the shaft of plunger 725 instead of pulling orthogonally to the shaft of plunger 725, which could bind plunger 725. This embodiment can produce slightly smoother motion of the spring, which acts linearly rather than around a bend in previous embodiments.

Figure 15:
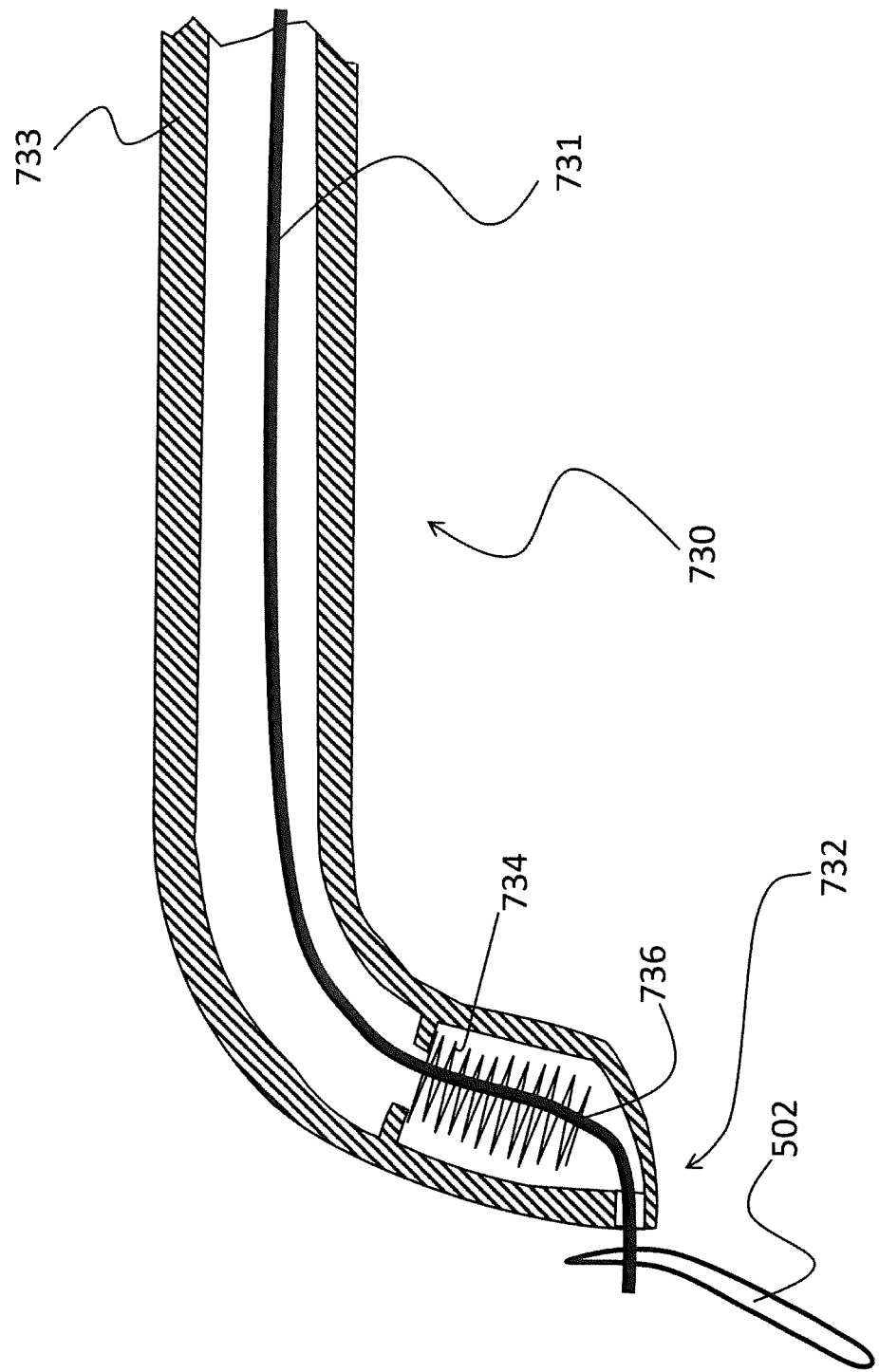
FIG. 15 shows a direct elbow end effector, which is similar to the double elbow end effector of FIG. 13 but somewhat smaller.

In another embodiment, FIG. 15 shows a direct elbow end effector 730 comprised of a tube 733 around a cord 731. A spring 734 pushes on cord 731 at a connection point 736, generally biasing cord 731 to release eyelash extension 502 similar to the previous embodiments. It can be seen that direct elbow end effector 730 has a similar overall geometry to doubled elbow end effector 744 but with the second bend accomplished at a tip 732 rather than at a second bend 750 in FIG. 13.

Figure 16:
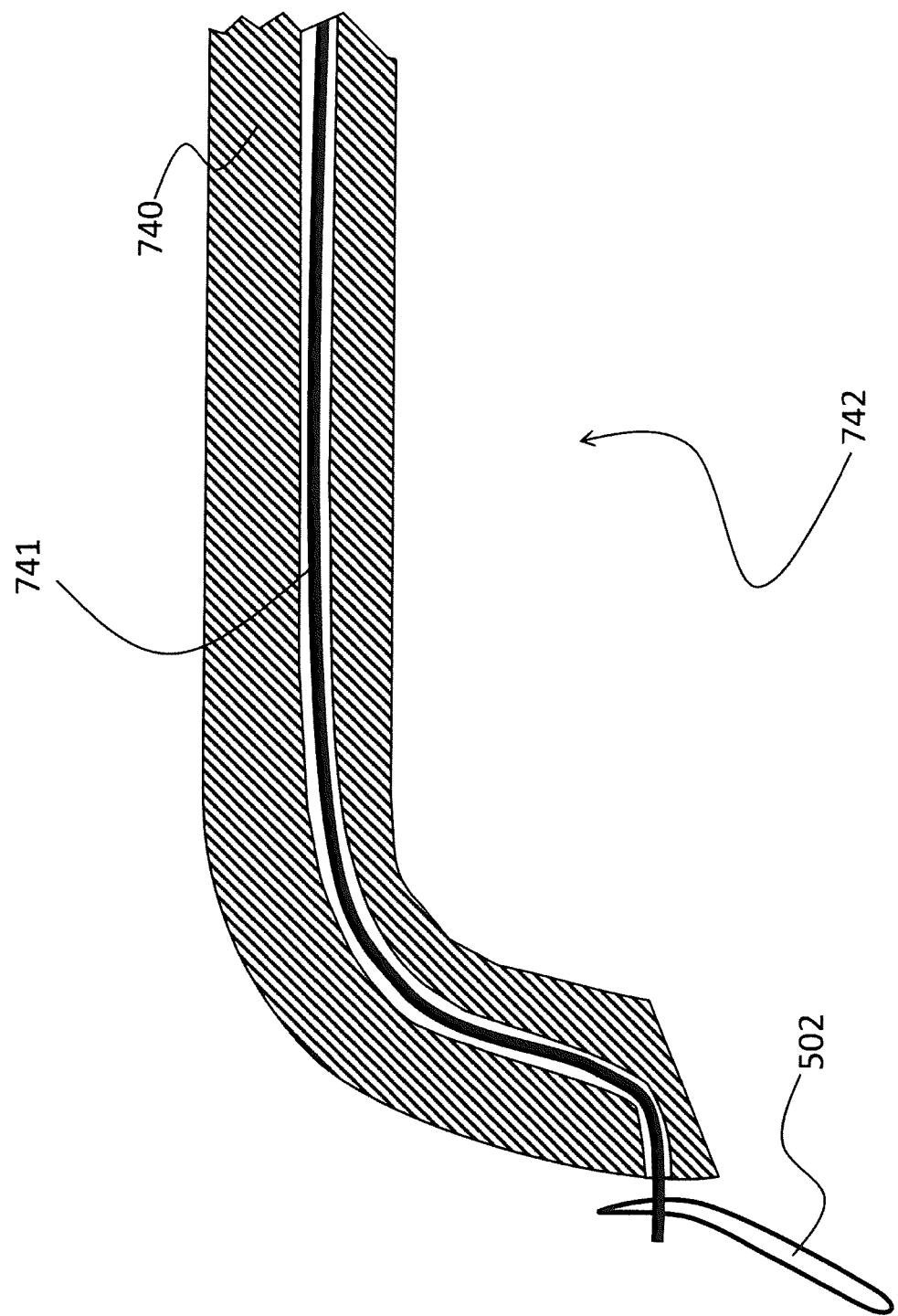
FIG. 16 shows a small diameter end effector.

In another rather simple embodiment of FIG. 16, a small diameter end effector 742 has a very small internal passageway, just large enough to allow passage of a cord 741. While this is achieved by simply making the internal diameter of a tube 740 very small, it can also be achieved by using two nested tubes, one with the outside diameter of tube 740 and a second internal tube with the internal diameter of tube 740, which would reduce the overall weight compared to tube 740. Regardless of construction, the advantage of this embodiment is that cord 741 is less likely to loop back on itself within the small internal passageway than it would in the previous embodiments. This allows for the omission of a spring, simplifying the design. Still, this design can be more prone to binding when it is desired to release eyelash extension 502. In some embodiments, lubrication is used within tube 740 to help reduce this binding.

Figure 17:
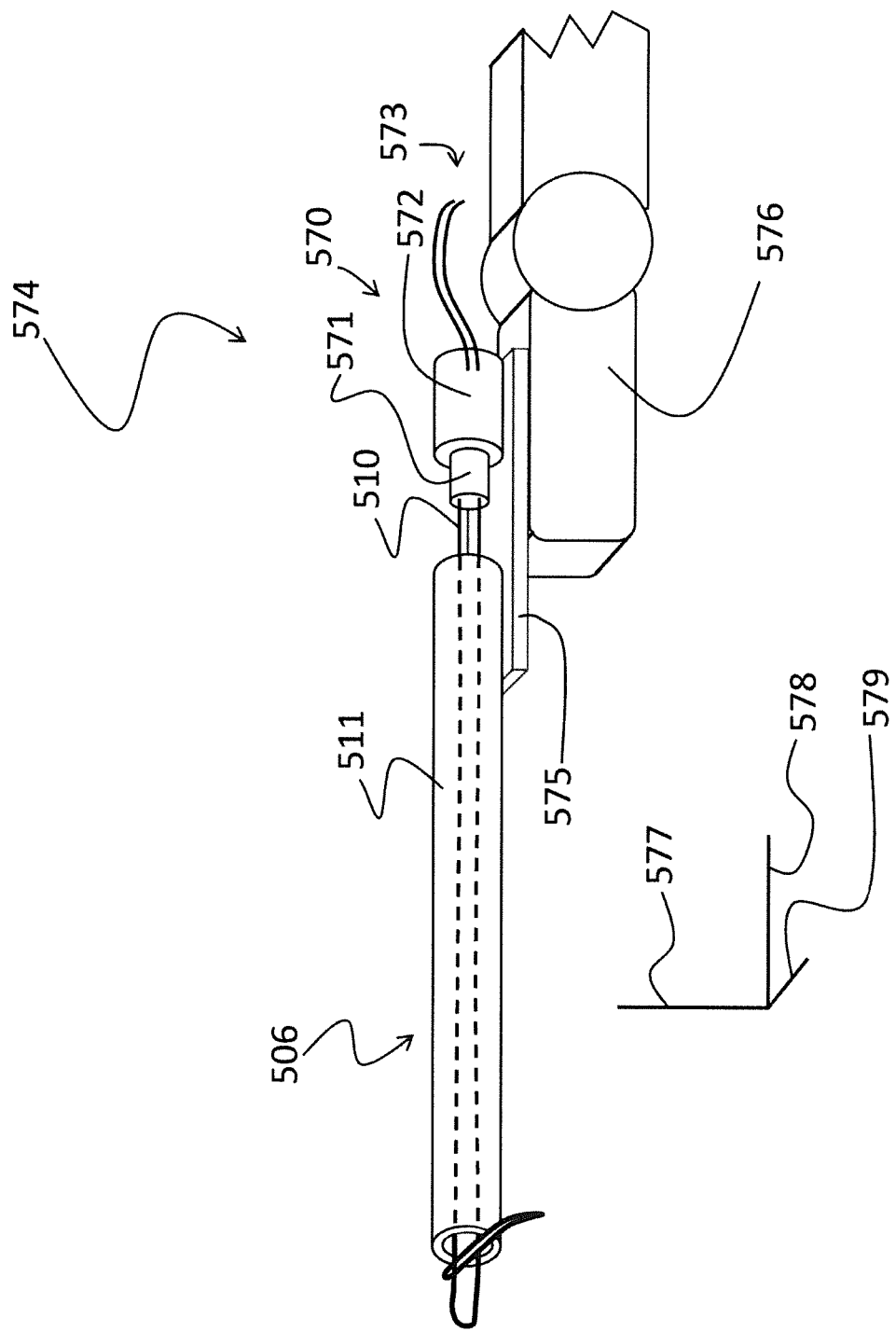
FIG. 17 shows a very simple actuation configuration applicable to the foregoing end effectors.

For all the above embodiments, tension (and sometimes compression) is generated in the various cords. There are many ways to create tension (and slight compression) in a cord. Furthermore, given that small forces are used to retain eyelash extension 502, the tension used is small and on the order of single newtons. It should be noted that this is also sufficient to overcome the spring forces generated in the various sprung embodiments presented above. In a rather simple exemplary embodiment shown in FIG. 17, a linear motor 570, having a stator 572, a rotor 571, and electrical wires 573, produces the desired tension in cord 510. Stator 572 is attached to the proximal end of end effector 506 with a baseplate 575. Baseplate 575 is then connected to the end of a robot 576. Of course, there are many ways known in the art to generate such tension, including various devices which produce linear motion such as linear brushless motors, voice coil motors, linear brushed motors, solenoids, pneumatic cylinders, and others. It is also possible to use a rotary device, such as an electric motor, in conjunction with a reel, mechanism, or lever to translate the rotary motor motion into linear motion to tension cord 510. Of course, while the rather simple end effector 506 has been shown here, such motor arrangements apply equally well to the other embodiments presented above. This collection of parts that allows for the selective tension of a cord is often referred to here as an actuator 574. It should be noted that one of the advantages of this whole collection of looped cord actuators is that they can pull with a large force relative to the weight of eyelash extension 502 (single newtons being considerably more than the weight of eyelash extension 502). This is useful because eyelash extension 502 can come adhered to a supply plate and require considerable force to remove.

In some embodiments, additional actuators are provided between robot 576 and baseplate 575. These actuators can be used to provide fine adjustment to the orientation of end effector 506. Typically, these actuators would be used to adjust angular orientation about one or more of a Y-axis 577, an X-axis 578, and a Z-axis 579. This is particularly useful in embodiments where the robot does not have sufficient degrees of freedom to arbitrarily orient end effector 506. In some embodiments, these actuators can even adjust translation along one or more of X-axis 577, Y-axis 578, and Z-axis 579. These actuators are generally proximal to end effector 506, like actuator 574, and should be considered, from the point of view of designing an inherently safe robotic system, to be part of the robot because they can injure the subject if they come into contact with the subject.

Electrostatic Grasping

Figure 18:
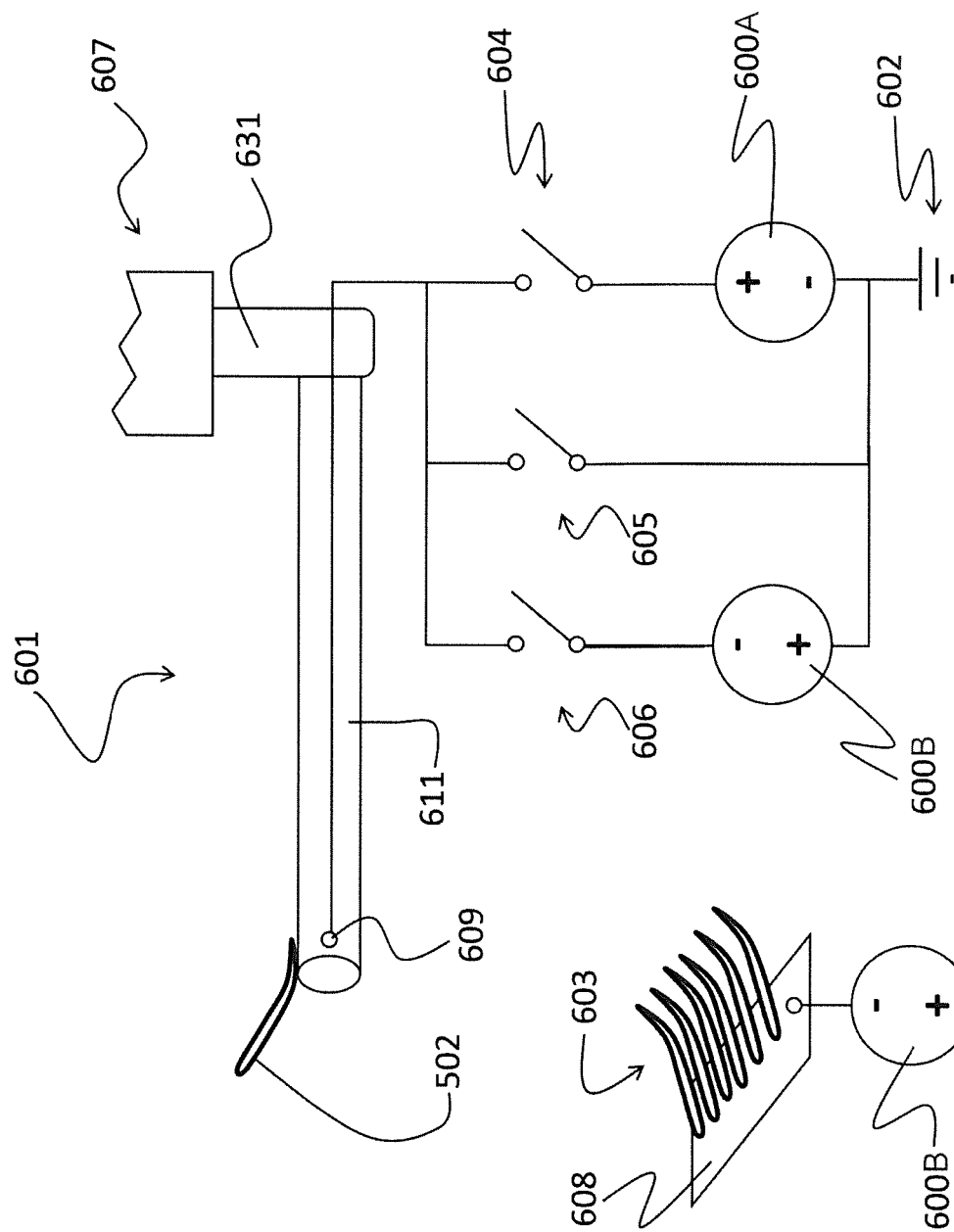
FIG. 18 shows an entirely different type of end effector, an electroadhesive end effector that uses static charge to grasp the eyelash extension.

In another embodiment, the end effector does not use a cord to hold an eyelash but instead uses electrostatic forces. That electrostatic forces are capable of holding hair should be self-evident to anyone with long hair in a dry climate: human hair often clings to clothes and objects that become statically charged during dry weather. This property is sometimes referred to electroadhesion. FIG. 18 shows a simple embodiment of an electroadhesive end effector 601 where a nonconductive tube 611 is intentionally statically charged by a static electricity generator 600A with respect to a ground 602. Closing an electrically actuated switch 604 connects a tube tip electrode 609 to static electricity generator 600A. By driving electrically actuated switch 604 from the robot controller, the robot can selectively attract eyelash extension 502 to nonconductive tube 611. Nonconductive tube 611 should be nonconductive so that the static charge deposited by tip electrode 609 does not rapidly dissipate back through a robot 607. Furthermore, an electrically actuated bypass switch 605 is provided to ground tube tip electrode 609 and therefore release eyelash extension 502. In some embodiments, an electrically actuated reversing switch 606 is provided to connect tube tip electrode 609 to a reverse polarity static electricity generator 600B and actively repel eyelash extension 502, aiding in its release. Of course, it should be understood that only one switch should be closed at any time so that the static electricity generators are not shorted.

In some embodiments, the supply of eyelash extensions can be charged, as in a charged extension supply 603, which is comprised of a charged extension base 608 and reverse polarity static electricity generator 600b. Precharging the extensions can increase the attraction between eyelash extension 502 and nonconductive tube 611 upon pickup. Of course, care should be taken to ensure that the eyelash extensions in charged eyelash extension supply 603 are spaced sufficiently to allow for attraction of no more than a single eyelash extension at a time. In some embodiments, charged extension supply 603 includes individual traces so that the charge of each eyelash extension can be controlled independently, and therefore only one eyelash at a time is attracted to tube 611.

In practice, such an electrostatic gripper can be extended by controlling the relative charge of subject 301 as well. That is, it can be desirable to keep the charge on the human eyelash of approximately equal potential to that of eyelash extension 502 so that eyelash extension 502 is not disturbed as nonconductive tube 611 approaches. Then, the charge on the human eyelash can be reversed in sync with the charge on nonconductive tube 611 to affect a smooth transfer. A similar technique can be used to transfer adhesive onto an eyelash extension. In general, the advantage of this approach is that no moving parts are needed to grasp an eyelash, reducing machine complexity. The main drawback is that the grasping force is quite small compared to the looped cord embodiments previously presented and can be affected by environmental humidity. Lastly, for practical application, charge (and more importantly, current) should be controlled to be well within safe human tolerance. But of course, common experience teaches that static electricity charge and discharge may be uncomfortable but is not generally hazardous.

Applications Outside Eyelash Extension

Figure 19:
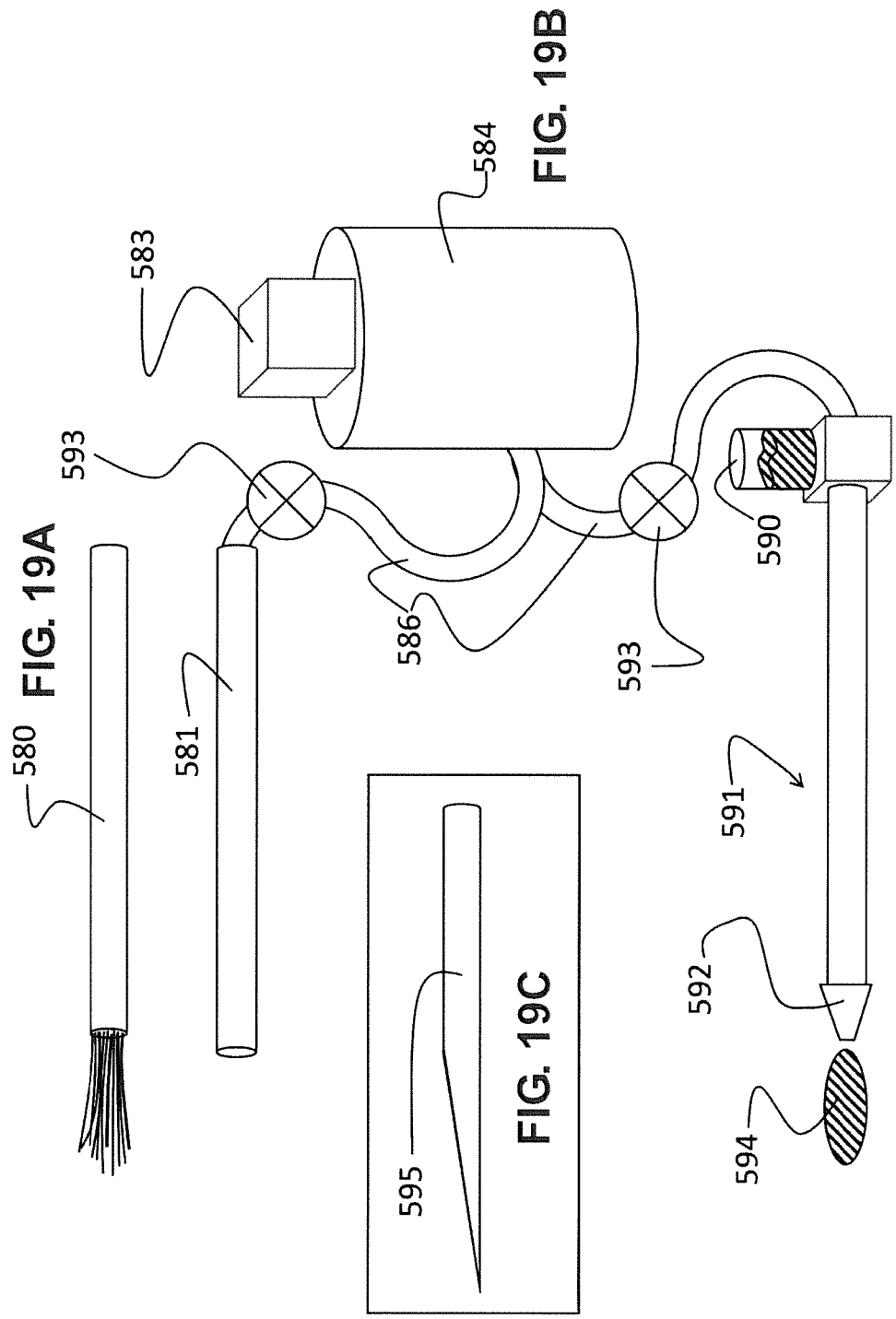
FIG. 19A depicts another inherently safe end effector for use with a robot in a beauty salon.
FIG. 19B depicts additional inherently safe end effectors for use with a robot in a beauty salon.
FIG. 19C depicts a further inherently safe end effector for use with a robot in a beauty salon.

In some embodiments, other apparatuses are used in conjunction with the robot. These end effectors can be attached to robot 530 at tube mount 532. For example, in FIG. 19A, a brush end effector 580 is shown. In the preferred embodiment, brush end effector 580 is a nail brush used to paint the nails of a human subject, but it can also be, for example, a mascara brush. As above, it should be made with a lightweight flexible tube that will buckle upon impacting the body of subject 301. In FIG. 19B, an air compressor 583 compresses air into a tank 584 which is then distributed through air hoses 586. A simple tube 581 is nothing more than a tube held by robot 530 and used to dispense air. This can be desirable in drying a wet surface on the body of subject 301, such as hair or skin, made wet during a cosmetic procedure. An airbrush 591 is also connected to compressor 583 and is akin to a common commercial airbrush. In order to minimize the mass at the tip of airbrush 591, a paint reservoir 590 is provided on the proximal end of airbrush 591, at or behind the point of connection to robot 530. An airbrush nozzle 592 is the only substantial distal mass and produces a paint spray 594. In both embodiment connected to compressor 583, valves 593 are provided. Valves 593 are intended to be controlled by robot 530 so that the dispensing of paint or air occurs in conjunction with the motion of the robot. In some embodiments, airbrush 591 sprays water instead of paint, allowing for the selective wetting of a portion of the human body. In some embodiments, this water spray is used to accelerate the curing of cyanoacrylate adhesive during the process of eyelash extension. In some embodiments, the paint can comprise spray tanning solution and be used to apply a spray tan.

In a final embodiment in FIG. 19C, a probe 595 is shown. Probe 595 simply comprises a tube with a chiseled end and can be used to aid in the separation of eyelashes. It may have a sharp end, but has a very low buckling strength which is advantageous when probe 595 is properly used oriented towards subject 301.

Figure 20:
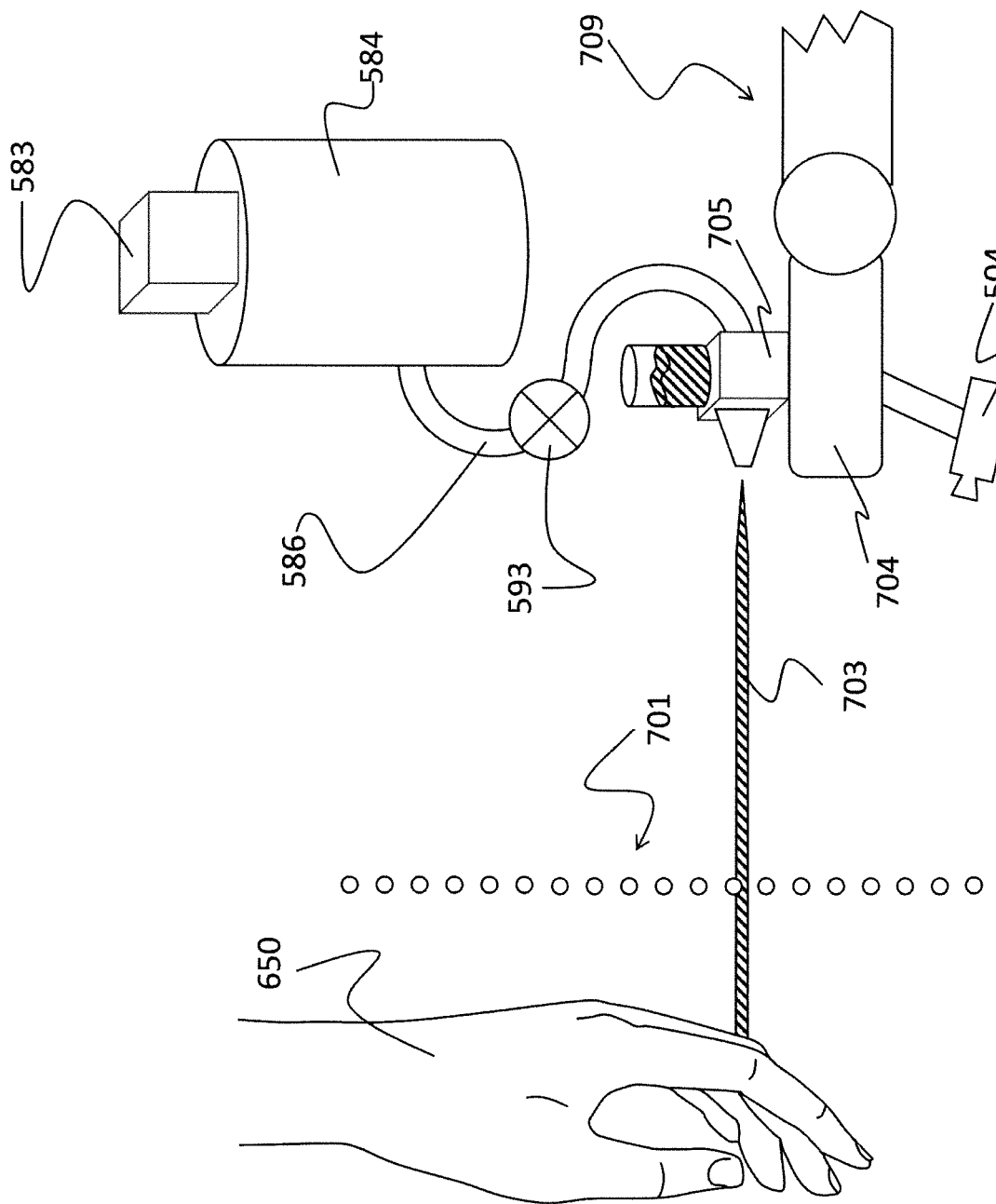
FIG. 20 shows an inherently safe airbrush system connected to a robot for use in a beauty salon.

Consider now FIG. 20, which shows a variation on the embodiment shown in FIG. 19B. Here, an airbrush 705 represents a conventional airbrush except that, as above, valve 593 is controlled by a robot 709, which is only partially shown. Here, conventional airbrush 705 produces a coherent stream 703, which can be applied at a distance. In a sense, then, coherent stream 703 is the end effector itself, in the same way that, in previous embodiments, the end effector was primarily comprised of a tube. This allows robot 709 to not come close to a subject 650, thereby preserving safety so long as subject 650 does not reach into the space of robot 709. This can be ensured by providing a light curtain 701 that will disable robot 709 if subject 650 blocks light curtain 701. For this to be practical, the density of coherent stream 703 should be maintained below the threshold that would interrupt light curtain 701. In some embodiments, the coherence of stream 703 can be maintained by electrostatically charging the paint and grounding subject 650 so that the paint is actively attached to subject 650 by electrostatic charge. In this embodiment, it can be desirable for the paint to be a powder that sticks to human skin—as is the case for many kinds of makeup—rather than paint. One skilled in the art will note that, depending on the speed of robot 709 and the speed of its emergency stop circuit, two barriers separated by a "dead space" or "safety zone", as in FIG. 4 or FIG. 21, can be used to provide sufficient safety.

Figure 21:
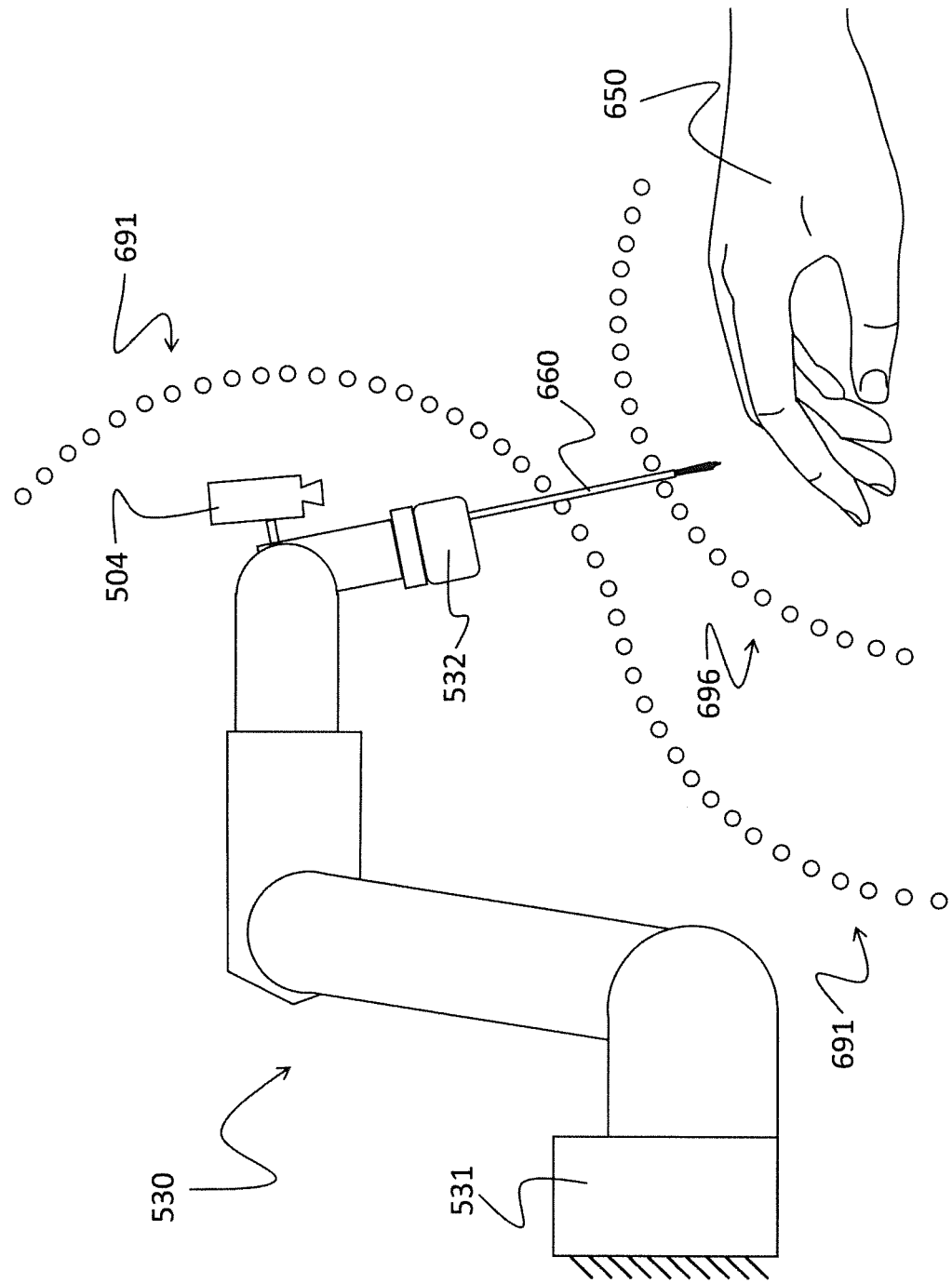
FIG. 21 shows an inherently safe nail polish applicator in use and controlled by a robot.

In an embodiment shown in FIG. 21, robot 530 is configured to use a nail polish applicator 660, which is similar to brush end effector 580, to apply nail polish to subject 650. Again, because nail polish applicator 660 is made to be very weak, it will bend if it comes into contact with subject 650 without causing harm to subject 650. In this embodiment, two light curtains are used to ensure safety, both of which are types of safety barriers. A robot light curtain 691 disables robot 530 if robot 530 breaks two or more light paths at the same time. Similarly, a subject light curtain 696 disables robot 530 if subject 650 (or any other object) breaks two or more light paths at the same time. In some embodiments, it is sufficient to use only one light curtain and eliminate subject light curtain 696. However, in general, two light curtains are preferred because it provides a "dead space" or "safety zone" between subject hand 650 and robot 530 so that robot 530 can decelerate before touching subject 650 and so that robot 530 and subject 650 cannot contact at robot light curtain 691. It should also be noted that, in some embodiments, the use of robot light curtain 691 is interchangeable with physical barrier 515 shown in FIG. 4.

In some embodiments, it is possible to use the range of motion limitations of the robot to provide safety. That is, in essence, if the subject is restricted to an area that cannot be reached by the robot but can be reached by an inherently safe end effector connected to the robot, the resulting system becomes inherently safe. For some robots, such as the six-axis robot shown thus far, it is difficult to operate near the limits of its range of motion because many of the joints of the robot will approach singularity, which is known in the art of robotics to be problematic. However, some robotic systems, such as Cartesian and SCARA-type robots, have a single actuator that controls the vertical (typically referred to as "Z") axis. This makes it very easy to establish the range of motion of the robot in vertical space and to operate it close to the end of its travel in vertical space. Therefore, it is simple to restrict a person to a vertical space that the body of the robot cannot enter.

Figure 22:
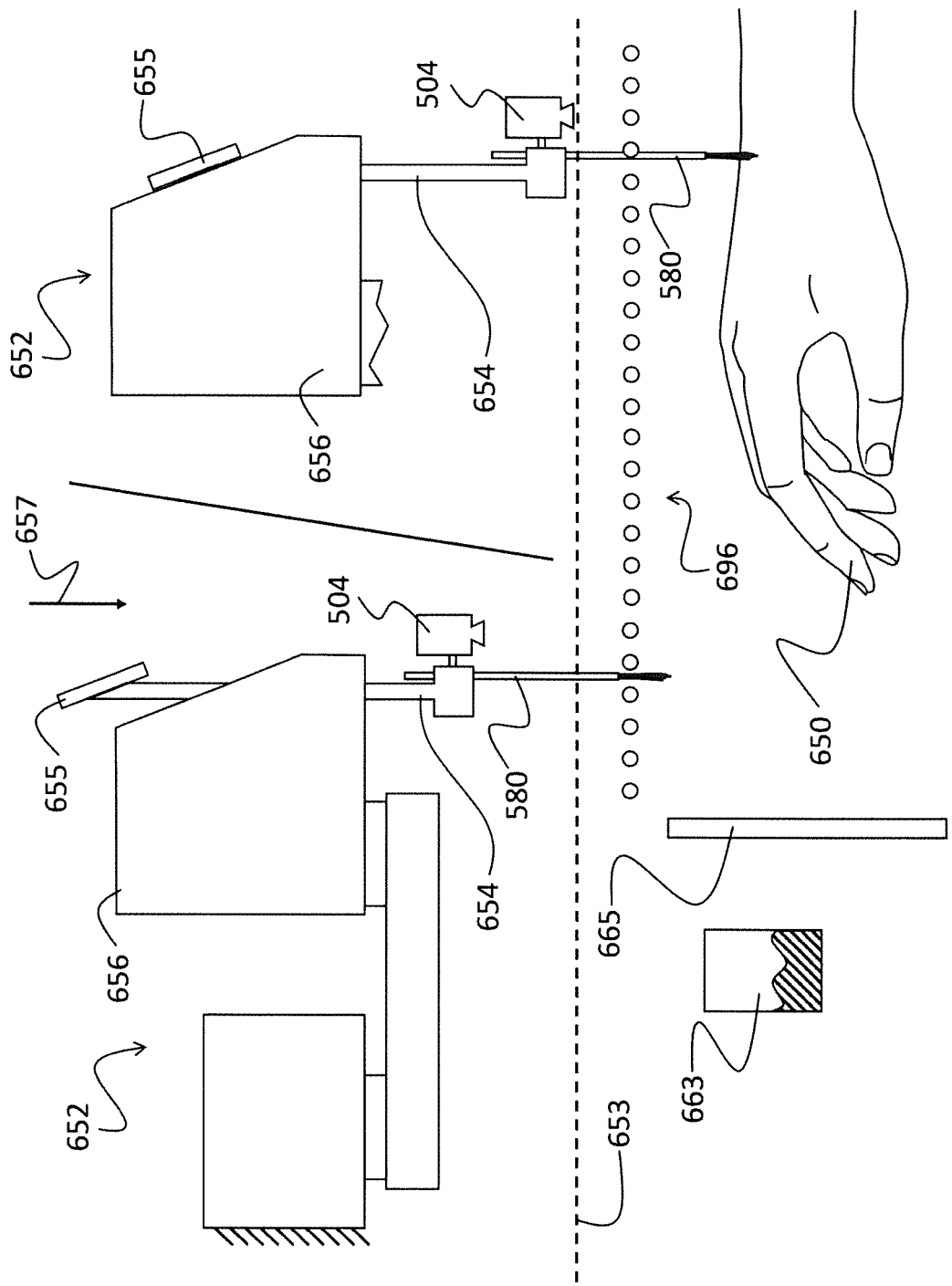
FIG. 22 shows a SCARA robot in use with a brush in a different inherently safe configuration.

Such an embodiment is shown in FIG. 22. Initially, attention is drawn to a SCARA robot 652. As is typical of SCARA robots, SCARA robot 652 is comprised of three actuated rotary degrees of freedom arranged in a horizontal plane, with a fourth vertical ("Z") axis arranged coaxially with the final rotary degree of freedom. Therefore, it is easy to see that vertical displacement of any end effector coupled to a SCARA output link 654 will have its vertical motion controlled solely by the fourth vertical axis. Because a hard stop 655 sets the maximum displacement of output link 654 along the direction of an arrow 657, it is easy to see that neither SCARA output link 654 nor computer vision system 504 can be displaced below a dashed line 653. Therefore, the safety of subject 650 can be ensured by providing only subject light curtain 696 so that subject 650 cannot reach into the area of operation of SCARA robot 652. Of course, brush end effector 580 should also be inherently safe, in that it will easily bend if it contacts subject 650. It can be desirable to further include a physical barrier 665 to block subject 650 from entering some area of robot access. This is because it can be cheaper to provide a physical barrier in areas where brush end effector 580 does not need to reach rather than using a light curtain here. Restricting access to such areas can also allow for placement of supplies such as a nail paint supply 663.

Figure 23:
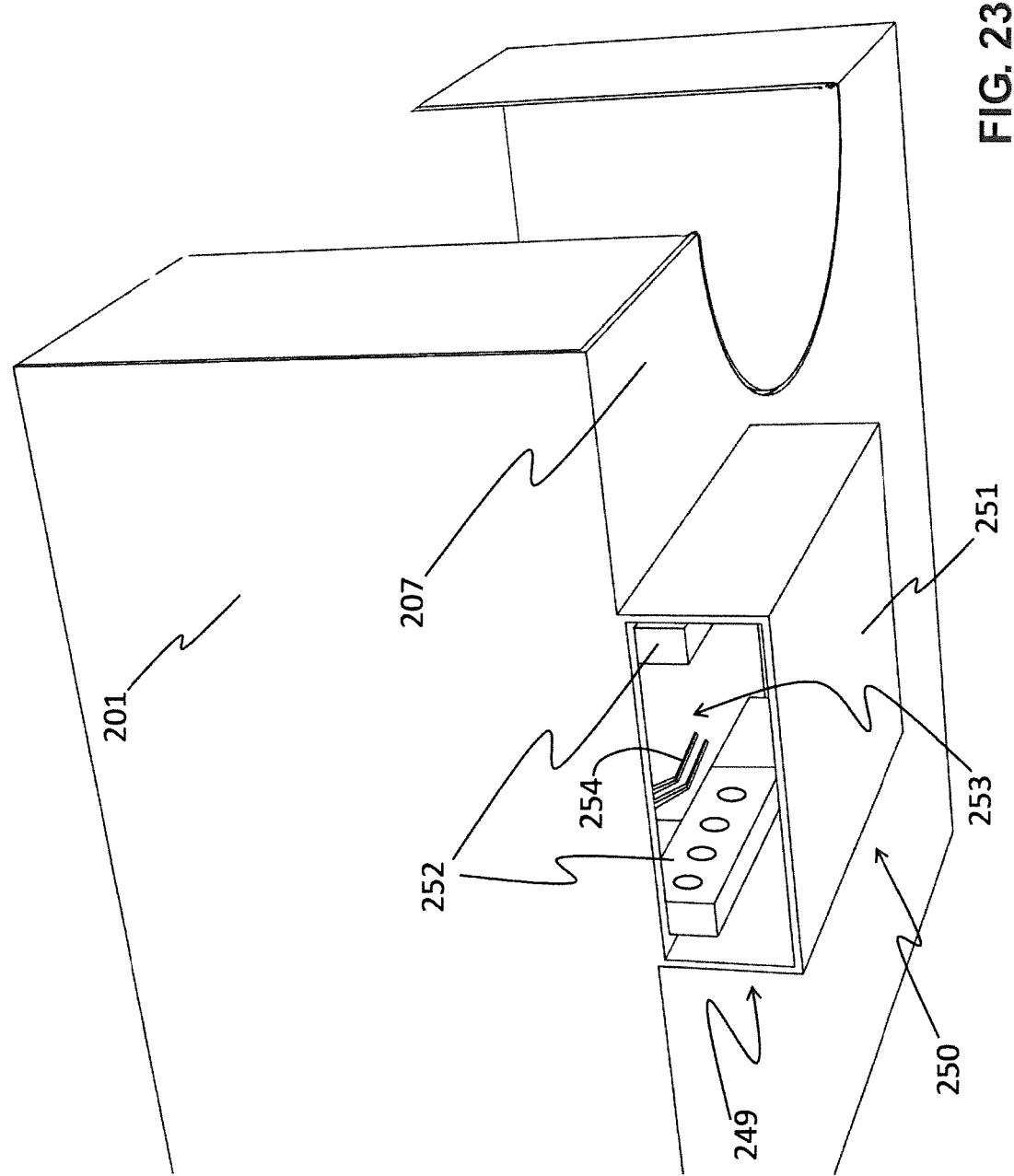
FIG. 23 show an alternate embodiment of the device of FIG. 22 but used with a robot inside an enclosure.

Another variation of this embodiment is shown in FIG. 23, which shows the left side of enclosure 201 that encloses a robotic mechanism (not shown). Here, it can be seen that there is an access window 249 that does not require a door in this embodiment. Access window 249 is a window through which a subject's hand can be presented to have his or her nails painted. Access window 249 gives access to a sub-enclosure 250 which is shown protruding from an enclosure floor 207. Sub-enclosure 250 has its own floor 251. Sub-enclosure 250 is below the working area of the robotic mechanism (which is not visible in the view of FIG. 23 but is within enclosure 201) such that, if the robot were holding a tool such as a nail polish applicator in tweezers 254, the nail polish applicator could touch the hand of a subject lying on floor 251, but tweezers 254 could not touch the hand. This ensures the safety of the subject in the event of a malfunction of the robotic mechanism, since it is unlikely that a person can get injured by being struck by a flexible nail polish applicator. The system confirms that the subject has not moved his or her hand into the working area of the robotic mechanism with a light curtain device 252 mounted at an opening 253 between sub-enclosure 250 and main enclosure 201. Light curtain 252 does not run the whole length of opening 253 such that the nail polish applicator held by tweezers 254 can access the subject's finger nails without breaking light curtain 252, which would stop the device. It can be seen, however, that it would be extremely difficult for a subject to gain access to main enclosure 201 with his or her hand without breaking light curtain 252 and stopping the device. In practice, the user can place nail polish in standard bottles with standard applicator type lids with the applicator caps loosened so that they can be grabbed by tweezers 254 (tweezers 254 can be created with special features to make this easier). The user then can instruct the subject to lay his or her hand on floor 251 of sub-enclosure 250 with his or her nails in the accessible zone for the robotic mechanism. Then, the robot can retract the applicator from the nail polish bottle, adjust the amount of liquid on the applicator by running it over the edge of the opening of the nail polish bottle just as a human would, proceed to opening 253, and proceed to apply polish to the subject's finger nails. One skilled in the art will note that the robot can apply nail polish top coat over the nail polish and apply nail polish remover (to touch up nails). It is even possible that a textile pad can be provided to the robotic mechanism so that it can remove nail polish after applying nail polish remover all over a nail. However, removing nail polish is much easier for a human than applying it, so it may not make sense for the robot to perform this task.

Figure 24:
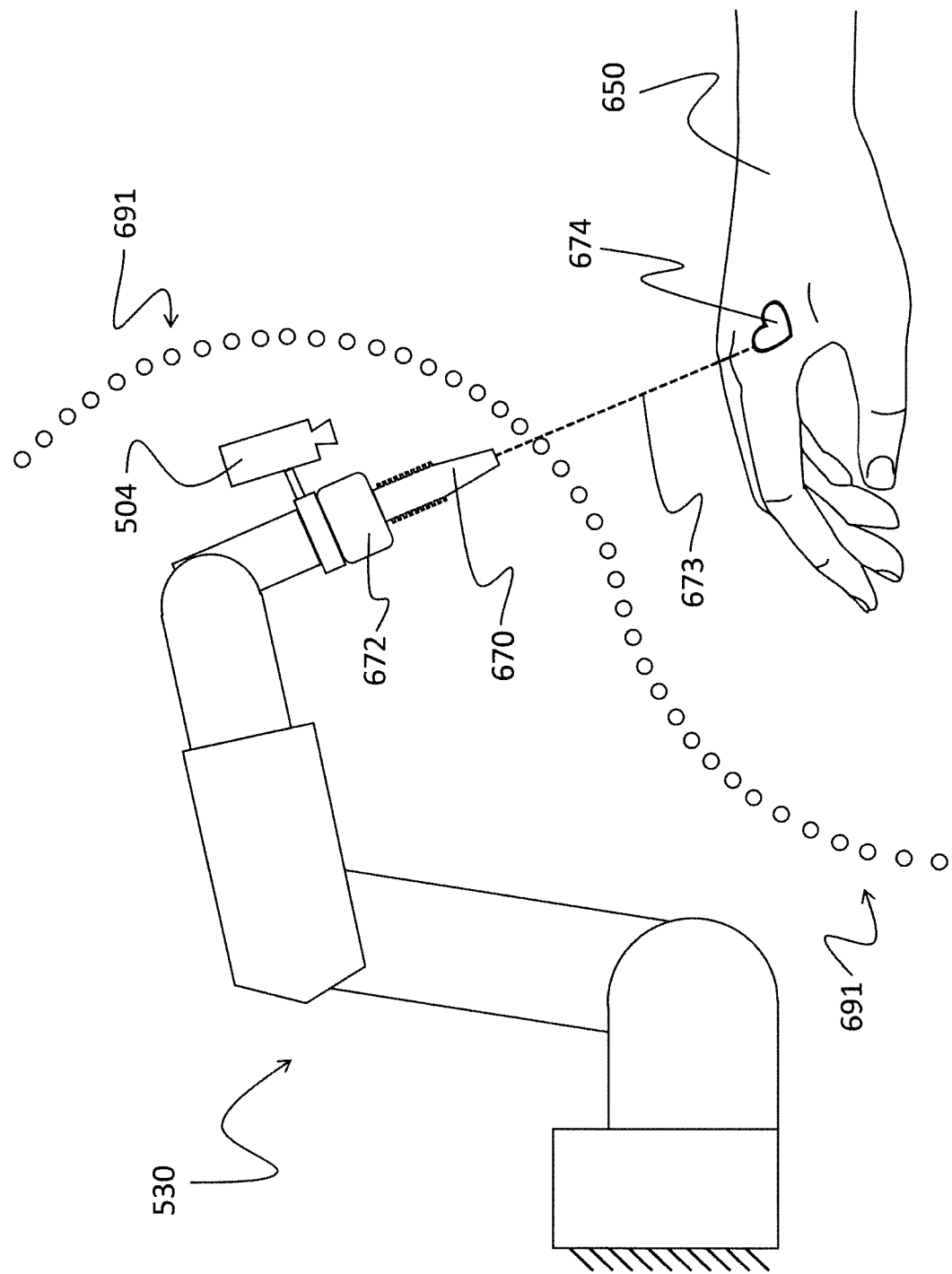
FIG. 24 shows how similar configurations to those presented above can be used with a laser, providing for cosmetic treatments using a laser.

In yet another embodiment shown in FIG. 24, a laser unit 670 is coupled to robot 530 through a coupler 672. Laser unit 670 can comprise a laser intended for hair removal, skin rejuvenation, tattoo removal, or other cosmetic or medical skin treatments. Although there are various types of lasers used for these purposes, the exact type of laser used is not important for this embodiment because any of these lasers can be adapted for use with robot 530. Here, only robot light curtain 691 is provided because laser unit 670 is rather blunt, and the risk posed to subject 650 by incidental contact with laser unit 670 is rather small (which could only be momentary because breaking robot light curtain 691 will disable robot 530). It is also worth noting that, in this embodiment, it is possible to allow no individual beam of robot light curtain 691 to be broken, unlike the single beam allowed above, because a laser light 673 will not break any beam of robot light curtain 691. It can be seen that laser light 673 is directed by the orientation of laser unit 670 (and therefor robot 530) to help remove an unwise tattoo 674 from subject 650. In a sense, this embodiment is effective because laser light 673 acts as the end effector and cannot mechanically injure the person. It is also important to note the limitations of this embodiment. First, the eyes of subject 650 and any other person in the vicinity should not be oriented so that laser light 673 can reach them. This can be achieved with dark glasses or a shroud. Second, and more importantly, a supervisory system monitoring laser dosage should be provided. This is because robot 530 is not built to have the extreme safety ratings needed to ensure that it does not dwell in a single location for an unsafe time. Such a supervisory system should monitor the dosage of laser radiation delivered to a certain skin area and shut off laser unit 670 if the dosage exceeds the prescribed amount.

Figure 25:
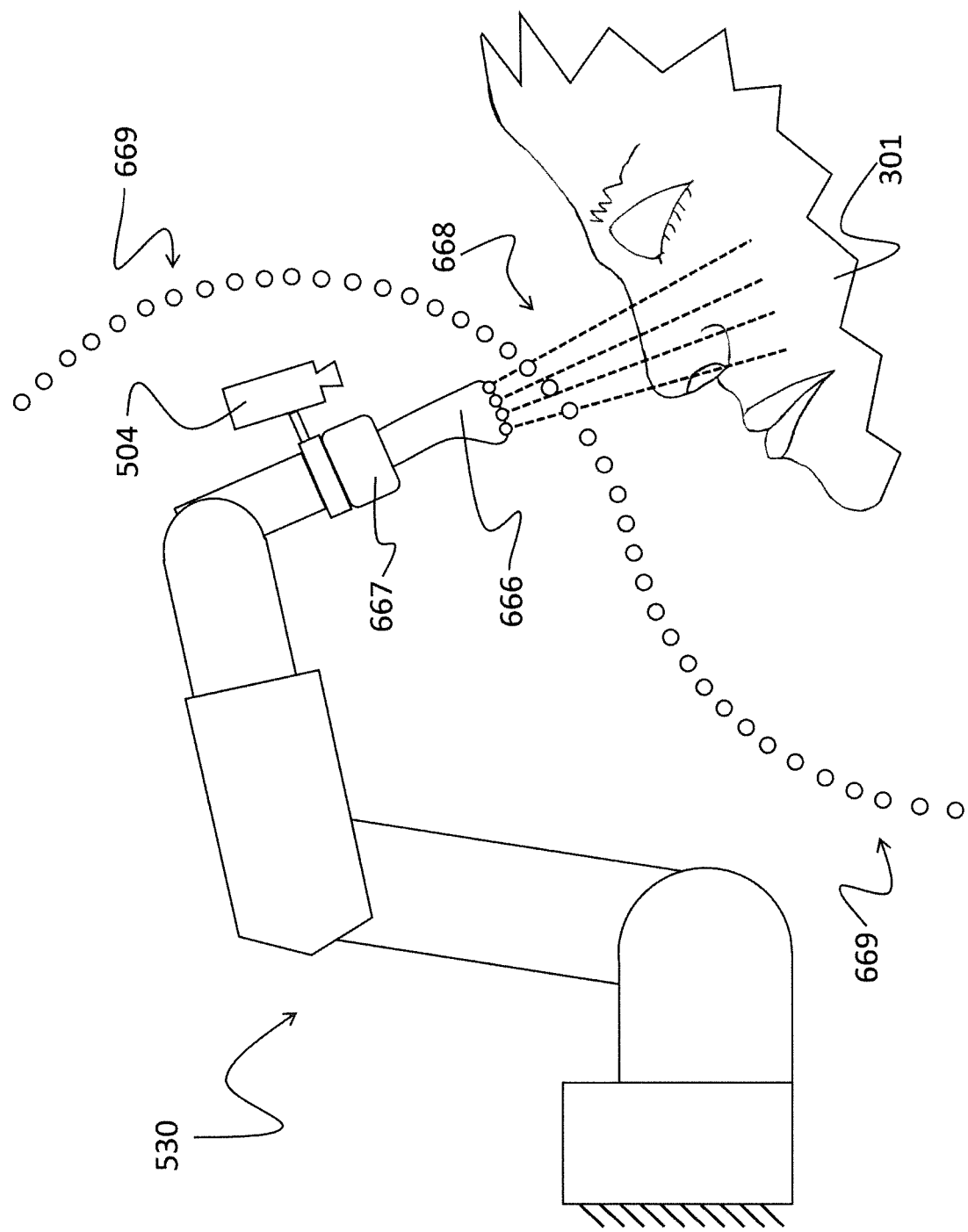
FIG. 25 shows an alternate embodiment of FIG. 24 where an LED module is used to provide skin therapy.

In some embodiments, laser unit 670 can be replaced with an LED module 666, as shown in FIG. 25, which is used for skin treatments. LED skin treatments have become more popular, with specific wavelengths of light used to kill bacteria (treating, for example, acne) and other wavelengths thought to accelerate healing and tightening of skin. Present LED skin treatment modules provide rather broad coverage or require extensive manual application. However, the present invention can allow for more targeted treatments. Computer vision system 504 can be used to automatically identify target areas, with robot 530 directing the orientation of LED module 666 through a robotic adaptor 667. LED light 668 is then applied to a specific area of subject 301. Here, a robot light curtain 669 is tailored to the specific standoff requirements of LED light 668 but generally comprises a similar safety barrier. LED module 666 is similar or can be the same as commercial LED skin treatment systems but can also be modified to be more focused so that LED light 668 can be better directed. In some embodiments, a supervisory system is provided, as in the previous laser embodiment, but this may not be desired if LED light 668 is low enough intensity to not injure subject 301 even if misaimed.

Figure 26:
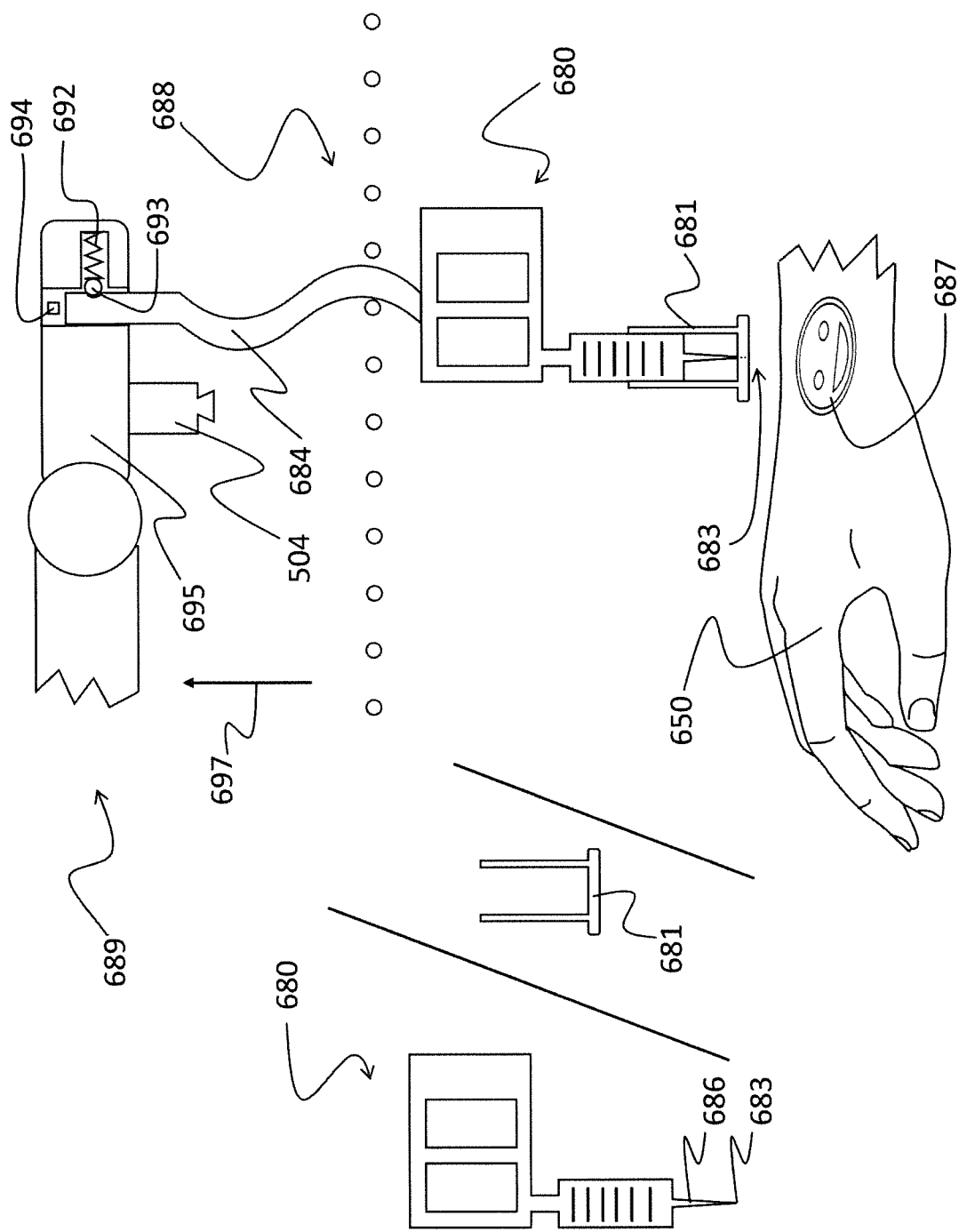
FIG. 26 shows a variation that can be used for tattooing.

In another embodiment diagrammed in FIG. 26, a tattoo machine 680 is connected to a robot 689 through a beam 684 (which is, like the various tubes above, a type of strut). Because tattoo machine 680 weighs much more than an eyelash extension or nail polish (tattoo machines often weigh on the order of 100 grams), the very weak tubes used previously cannot hold tattoo machine 680. However, tattoo machines do not generally work near the eyes, and beam 684 can be designed so that it will accurately position tattoo machine 680 when operating at low accelerations but will bend under a safe amount of load if robot 689 attempts to drive tattoo machine 680 into subject 650. Alternatively, beam 684 can be designed to be stiff but brittle, so that beam 684 will break in the event that robot 689 attempts to drive tattoo machine 680 into subject 650. As depicted in FIG. 26, beam 684 is bent (so that beam 684 is not excessively stiff) and is held in place in a robot end link 695 by a ball detent 693, which is pressed in place by a spring plunger 692 (the front face of robot end link 595 is omitted to show these details). In the event of excessive load along beam 684, ball detent 693 depresses spring plunger 692, allowing beam 684 to move along the direction of an arrow 697, thereby reducing the load (i.e., this mechanism provides a breakaway connection). In some embodiments, a switch 694 is further provided. Switch 694 is toggled in the event that beam 684 displaces past switch 694, and this is configured to disable robot 689. In some embodiments, switch 694 can be a mechanical switch, a photodiode and light, or hall effect switch or any other similar switch known in the art.

As before, a light curtain 688 prevents the components of robot 689 or computer vision system 504 from touching subject 650. Tattoo machines themselves can be somewhat daunting, especially in consideration of a tattoo needle 686 protruding from tattoo machine 680. In a first modification, this issue can be partially alleviated by attaching a needle stop 681 to tattoo machine 680. For clarity of illustration, both tattoo machine 680 and needle stop 681 are reproduced in isolation. Needle stop 681 prevents all but a sharp tip 683 from penetrating skin of subject 650—something achieved by the skill of the tattoo artist in manual use. In some embodiments, needle stop 681 can be incorporated into tattoo machine 680. The primary utility of needle stop 681 is to obviate the possibility that a runaway condition of robot 689 could possibly result in subject 650 being stabbed with tattoo needle 686. Of course, in such a condition, sharp tip 683 could still penetrate the skin of subject 650, but as this is an intended outcome of the tattoo process, sharp tip 683 is already sterilized, and the injury would be negligible. Normal operation then comprises tattoo machine applying a desired tattoo 687 according to instructions given to robot 689. Robot 689 can further monitor progress through computer vision system 504.

Nevertheless, simply shrouding tattoo needle 686 is insufficient to provide the desired degree of safety. Because tattoo machine 680 can be of substantial mass, and because beam 684 is somewhat stiff, a runaway condition could result in injury to certain parts of the human body (such as the eyes for example). However, other parts of the body, such as the arms and legs, would be safe from injury. Appropriately restricting the area of application of the robot (through barriers or limited robot range of motion) to such areas of the body can provide inherent safety.

The foregoing discussion raises an important point—the question of what is inherently safe depends on the section of the human body under discussion. This is intuitively obvious—the eye can sustain much less force (or pressure, if force is normalized by area) than the forearm without incurring damage. Conveniently, this concept has been widely embraced in the design of co-robotic systems such as those described here. For example, consider Table 1 below, reproduced from the BG/BGIA risk assessment recommendations according to machinery directive published by the Institute for Occupational Safety and Health of the German Social Accident Insurance (2009 ed., revised 2011).

TABLE 1

Limit values for the forces, pressures and body deformation constant according to the body regions of the body model:

| Body model - Main and individual regions with codification | | Limit values of the required criteria | | | |
|---|---|---|---|---|---|
| BR | Regions | CSF [N] | IMF [N] | PSP [N/cm$^2$] | CC [N/mm] |
| 1. Head with neck | 1.1 Skull/Forehead | 130 | 175 | 30 | 150 |
| | 1.2 Face | 65 | 90 | 20 | 75 |
| | 1.3 Neck (sides/neck) | 145 | 190 | 50 | 50 |
| | 1.4 Neck (front/larynx) | 35 | 35 | 10 | 10 |
| 2. Trunk | 2.1 Back/Shoulders | 210 | 250 | 70 | 35 |
| | 2.2 Chest | 140 | 210 | 45 | 25 |
| | 2.3 Belly | 110 | 160 | 35 | 10 |
| | 2.4 Pelvis | 180 | 250 | 75 | 25 |
| | 2.5 Buttocks | 210 | 250 | 80 | 15 |
| 3. Upper extremities | 3.1 Upper arm/Elbow joint | 150 | 190 | 50 | 30 |
| | 3.2 Lower arm/Hand joint | 160 | 220 | 50 | 40 |
| | 3.3 Hand/Finger | 135 | 180 | 60 | 75 |
| 4. Lower extremities | 4.1 Thigh/Knee | 220 | 250 | 80 | 50 |
| | 4.2 Lower leg | 140 | 170 | 45 | 60 |
| | 4.3 Feet/Toes/Joint | 125 | 160 | 45 | 75 |

BR Body region with codification
Regions Name of the individual body region
CSF Clamping/Squeezing force
IMF Impact Force
PSP Pressure/Surface pressing
CC Compression Constant The lowest allowable pressure under Table 1 is on the front of the neck, at 10 N/cm$^2$, only one eighth of the allowable pressure on the thigh/knee and buttocks. The table does not indicate allowable pressures on the eye surface, but they may be presumed to be very low. However, internal testing using a thin layer of rubber over the eyelid to provide additional protection indicated that a 1 to 2 mm thick layer of rubber can provide enough distribution of force to reduce surface pressures to tolerable levels. The resulting surface pressure was estimated to be between 2 N/cm$^2$ and 10 N/cm$^2$. Taking the lower bound suggests a range of pressures allowable over the human body (assuming a thin layer of protection is provided over the eyes) of 2 to 80 N/cm$^2$.

Figure 27:
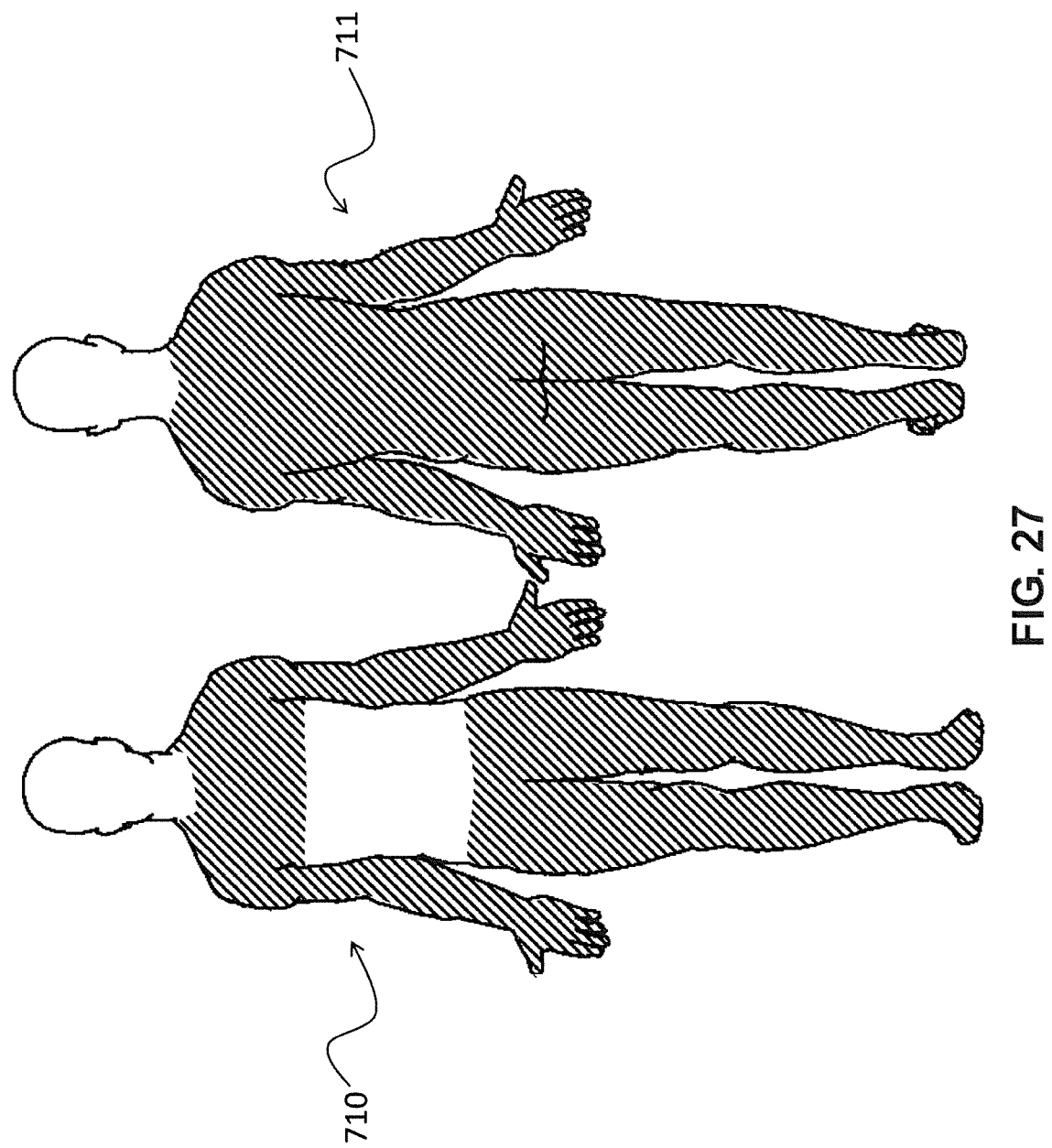
FIG. 27 shows the areas of the human body with an allowable pressure of more than 40 N/cm^2.

Therefore, it is possible to design an intrinsically safe robotic system for application of tattoos as shown in FIG. 26 provided peak accelerations are limited during use, beam 684 will breakaway or otherwise collapse under a reasonable load, light curtain 688 keeps the robot away from the subject, and the robot is limited in application to the regions of the human body with higher pressure tolerance. For example, FIG. 27 roughly shows areas of the body that have a tolerance of greater than 40 N/cm$^2$ as shaded areas on a body front 710 and a body back 711 (that is, areas that are within 50 to 100% of the maximum reported tolerance). It is clear that most parts of the body, and especially most parts of the body that are generally tattooed, are within these shaded areas (although it should be noted that these data presumably do not include places like the backs of the knees or genitals and such areas should be reasonably excluded). Thus, the process of determining that the device of FIG. 26 is safe is no more than ensuring that the worst possible collision produces surface pressures of no more than 40 N/cm$^2$.

Additionally, it should be noted that a similar strategy, based on the internally collected data on allowable eye surface pressures, can be used to ensure safety of the eyelash extension mechanisms previously discussed. In the most extensive embodiments, a mask can be provided that covers the subject's eyelids and increases the locally allowable surface pressure of the eyes.

Final Exemplary Embodiment

Figures 28A, 28B:
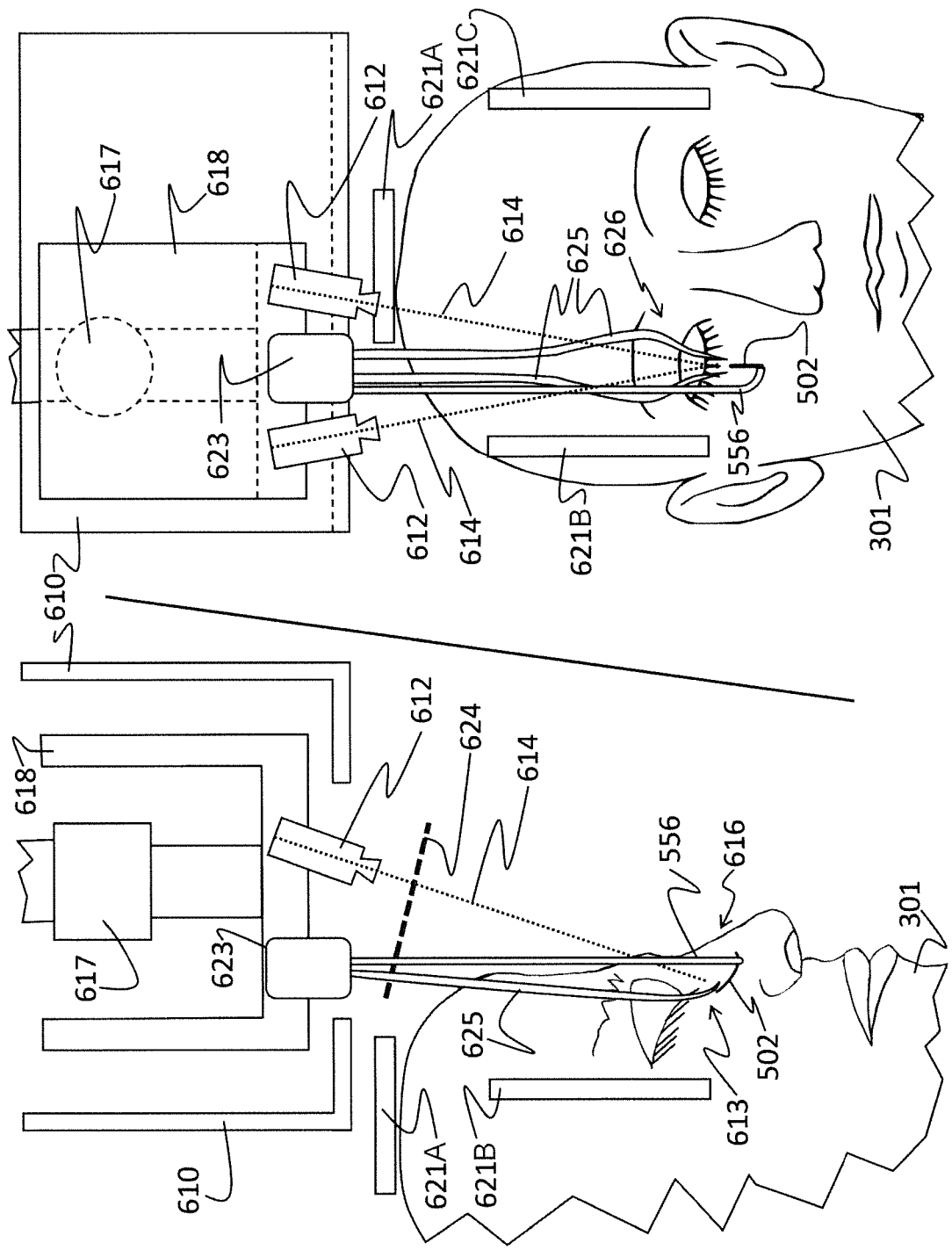
FIG. 28A is a side view of a capstone embodiment of the sprung elbow end effector working in conjunction with eyelash isolation probes to provide inherently safe eyelash extension for a subject.
FIG. 28B is a front view of the embodiment of FIG. 28A.

In a final example of an embodiment of the invention, consider FIGS. 28A and B, which show a front view and side view of an eyelash extension robot that is inherently safe through the use of previously discussed sprung elbow end effector 556. A robot 617 is partially visible at the top of the diagram and should be understood to have sufficient degrees of freedom to provide for manipulation of the distally mounted elements. For example, a six-axis arm or a SCARA-type robot is sufficient. Distal to robot 617 is a large feature 618, which is rigidly mounted to robot 617 and cannot fit through the gap in a physical barrier 610 in any orientation. Physical barrier 610, like physical barrier 515, is another example of a safety barrier. Mounted distally to large feature 618 (or alternatively in some embodiments mounted directly to robot 617) is a computer vision system 612 and an actuator cluster 623. Computer vision system 612 is generally oriented such that it can image a human eyelash area 616, and a dashed line 614 indicates, roughly, the center of this field of view. Of course, robot 617, despite large feature 618, can change the orientation of computer vision system 612 to properly align this field of view. Actuator cluster 623 is connected to a pair of eyelash isolation probes 625, which are analogous to probe 595, but have a more complex shape. The shape has two primary curves, a tip curve 613 that is visible in the side view and a body curve 626 that is visible in the front view. Tip curve 613 is provided so that the sharp tips of eyelash isolation probes 625 cannot touch subject 301 before the body of eyelash isolation probes 625 does. This will allow eyelash isolation probes 625, which are made of thin tubes or relatively compliant material, to bend before causing damage to subject 301, even if they inadvertently contact subject 301. Yet, eyelash isolation probes 301 can perform their purpose of separating the eyelashes of subject 301 because it takes almost no force to push a human eyelash. Body curve 626 is provided so that computer vision system 612 can see eyelash extension 502 and the human eyelash during the process—otherwise the view would be obscured.

Sprung elbow end effector 556 is also connected to actuator cluster 623. Because sprung elbow end effector 556 has an elbow near its tip, sprung elbow end effector 556, like eyelash isolation probes 625, will not obscure the view of vision system 612 when observing eyelash extension 502, as would be the case if, for example, end effector 506 were used instead. Sprung elbow end effector 556 also is designed such that its tip is not pointed towards the subjects' eye. This is apparent from examination of the front view of FIG. 28B. Because sprung elbow end effector 556 is made of a thin tube, sprung elbow end effector 556 will bend without hurting subject 301 even if it inadvertently contacts the face or eye of subject 301. Both sprung elbow end effector 556 and eyelash isolation probes 625 can be additionally translated and/or oriented by actuator cluster 623, in order to provide any fine adjustments desired after robot 617 has provided coarse position and, possibly, orientation. However, such fine adjustments do not substantially change the shape and orientation of actuator cluster 623. That is, the body of actuator cluster 623, discounting sprung elbow end effector 556 and eyelash isolation probes 625, does not move enough to substantially decrease its separation from human subject 301. This is important because actuator cluster 623 can fit outside physical barrier 610.

Further provided in FIGS. 28A and B are human limiters: a human limiter 621A, which is provided above the head of subject 301, and human limiters 621B and 621C, which are provided slightly in front of subject 301. Human limiters 621A-C prevent human subject 301 from entering the area where the body of actuator cluster 623 and computer vision system 612 protrude past physical barrier 610. In this way, it is insured that subject 301 cannot move his or her head immediately adjacent to the gap in physical barrier 610 when robot 617 is withdrawn within physical barrier 610 and then have robot 617 push the body of actuator cluster 623 and/or computer vision system 612 into the head of subject 301. A dashed line 624 generally represents the limit of travel of the body of actuator cluster 623 and computer vision system 612, and therefore the area above this is the rough keep out zone for subject 301 that is enforced by human limiters 621A-C. In some embodiments, human limiters 621A-C can comprise a more full face protective shield, and in some embodiments, can comprise nearly a complete enclosure between subject 301 and robot 617 except around the eyes of subject 301 so that subject 301 cannot reach his or her hands into robot 617. It should be stressed that this is desired because robot 617 cannot be guaranteed to be completely safe for human interaction even though sprung elbow end effector 556 and eyelash isolation probes 625 are safe for human interaction. As in the previously presented embodiments, this demonstrates how it is possible to retrofit a robot that is not rated for use around a person to become inherently safe and be used safely for cosmetic applications.

In some embodiments, the same device presented above may be used for extending eyebrows rather than eyelashes, as eyebrows have rather similar properties to eyelashes.

Based on the above, it should be readily apparent that the present invention provides a way to more effectively perform cosmetic procedures, such as installing eyelash extensions, which reduces both the time and the cost of doing so. The systems and methods of the present invention are demonstrably safe so that subjects can be confident in the procedures. Although described with reference to preferred embodiments, it should be readily understood that various changes or modifications could be made to the invention without departing from the spirit thereof. In general, the invention is only intended to be limited by the scope of the following claims.

The invention claimed is:

1. An intrinsically safe robotic system configured to perform a task on a subject, the system comprising:
   a robot;
   a safety barrier configured to extend between the subject and the robot, wherein the safety barrier is configured to prohibit interaction between the subject and the robot, thereby preventing the robot from harming the subject;
   at least one end effector attached to the robot, wherein the end effector is configured to extend through the safety barrier and readily deform upon contacting the subject, thereby preventing the at least one end effector from harming the subject.

2. The intrinsically safe robotic system of claim 1, wherein the at least one end effector includes light from a laser.

3. The intrinsically safe robotic system of claim 1, wherein the at least one end effector includes a flexible strut or tube.

4. The intrinsically safe robotic system of claim 3, wherein the flexible strut or tube has an anvil on a distal end, the anvil has at least two holes, the at least one end effector further includes a flexible cord running through the at least two holes to form a loop distal to the anvil, the flexible cord runs through the flexible strut or tube to a proximal end of the flexible strut or tube, the at least one end effector further includes an actuator at the proximal end of the flexible strut or tube, and the actuator is configured to selectively pull on the flexible cord to selectively change a size of the loop.

5. The intrinsically safe robotic system of claim 4, wherein the anvil has a groove with a cross section of 5-150 microns across.

6. The intrinsically safe robotic system of claim 4, wherein the anvil is not orthogonal to a central axis of the flexible strut or tube along at least one axis.

7. The intrinsically safe robotic system of claim 4, wherein the at least one end effector further includes a spring mechanism configured to increase the size of the loop.

8. The intrinsically safe robotic system of claim 1, wherein the at least one end effector includes a nail polish brush.

9. The intrinsically safe robotic system of claim 1, wherein the at least one end effector includes a tattooing device mounted on a flexible strut.

10. The intrinsically safe robotic system of claim 1, wherein the safety barrier includes at least one light curtain.

11. The intrinsically safe robotic system of claim 10, wherein:
   the least one light curtain is configured to be located between the subject and the robot,
   the light curtain includes a circuit configured to disable the robot when a pre-defined number of light paths are simultaneously broken, thereby preventing the robot from harming the subject;
   the at least one end effector is configured to extend through the at least one light curtain and break less than the pre-defined number of light paths, and
   the robot or a portion of the robot is configured to break more than the pre-defined number of light paths upon extending through the at least one light curtain.

12. The intrinsically safe robotic system of claim 1, wherein the at least one end effector includes a stream of spray from a spraying device.

13. The intrinsically safe robotic system of claim 12, wherein the stream of spray comprises at least one of a spray tanning solution, a skin treatment solution, air to dry hair of the subject, and damp air to accelerate curing of an adhesive.

14. The intrinsically safe robotic system of claim 1, wherein the at least one end effector includes a light source for skin treatment.

15. The intrinsically safe robotic system of claim 1, wherein the safety barrier includes:
   a first safety barrier extending around the robot, wherein the first safety barrier is configured to prohibit operation of the robot beyond the first safety barrier; and
   a second safety barrier configured to extend around the subject, wherein the second safety barrier is configured to prohibit egress of the subject beyond the second safety barrier or prohibit operation of the robot if the subject exits the second safety barrier; and
   a space between the first and second safety barriers comprising a safety zone.

16. The intrinsically safe robotic system of claim 15, wherein the second safety barrier is configured to allow a part of the subject to protrude to enable access by the at least one end effector.

17. The intrinsically safe robotic system of claim 16, wherein the part comprises at least one of an eyelash of the subject, hair of the subject, and a region of the body with an allowable pressure defined based on a value of safe loading for the region.

18. The intrinsically safe robotic system of claim 17, wherein:
the at least one end effector is configured to extend through the safety barrier and collapse when loaded to no more than the allowable load or pressure, and
the at least one end effector is restricted to the region by the safety barrier.

19. A method of performing a cosmetic procedure on a subject with a robot, an end effector coupled to the robot, and a safety barrier, the method comprising:
selecting a region of the subject for the cosmetic procedure;
defining an allowable load or pressure for the region;
orienting the robot and the safety barrier to limit access to the region;
configuring the end effector to collapse at no more than the allowable load or pressure; and
performing the procedure.

20. The method of claim 19, wherein the safety barrier includes a first safety barrier extending around the robot and a second safety barrier extending around the subject, said method further comprising:
prohibiting operation of the robot beyond the first safety barrier; and
prohibiting egress of the subject beyond the second safety barrier or prohibiting operation of the robot if the subject exits the second safety barrier.

21. The method of claim 19, wherein:
orienting the robot comprises orienting a flexible strut, including a flexible cord configured to form a loop, of the robot; and
preforming the procedure comprises actuating the flexible cord for grasping purposes.

22. The method of claim 19, wherein the cosmetic procedure includes treating the subject with a light source for skin treatment.

23. The method of claim 22, wherein the light source is a laser of the at least one end effector.

24. The method of claim 19, wherein the cosmetic procedure includes polishing a nail of the subject with a nail polish brush of the at least one end effector.

25. The method of claim 19, wherein the cosmetic procedure includes creating a tattoo on the subject with a tattoo device of the at least one end effector.

26. The method of claim 19, wherein the cosmetic procedure includes spraying the subject with a stream of spray from a spraying device.

27. The method of claim 26, wherein the stream of spray comprises at least one of a spray tanning solution, a skin treatment solution, air to dry hair of the subject, and damp air to accelerate curing of an adhesive.

* * * * *